United States Patent
Zhou et al.

(10) Patent No.: US 11,528,665 B2
(45) Date of Patent: Dec. 13, 2022

(54) PATHLOSS REFERENCE SIGNAL INFORMATION FOR MULTIPLE COMPONENT CARRIERS

(71) Applicant: QUALCOMM Incorporated, San Diego, CA (US)

(72) Inventors: Yan Zhou, San Diego, CA (US); Hamed Pezeshki, San Diego, CA (US); Xiao Feng Wang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/071,911

(22) Filed: Oct. 15, 2020

(65) Prior Publication Data

US 2021/0120500 A1    Apr. 22, 2021

Related U.S. Application Data

(60) Provisional application No. 62/923,469, filed on Oct. 18, 2019.

(51) Int. Cl.
*H04W 80/02* (2009.01)
*H04W 52/24* (2009.01)
(Continued)

(52) U.S. Cl.
CPC ........ *H04W 52/242* (2013.01); *H04B 17/309* (2015.01); *H04L 5/0051* (2013.01);
(Continued)

(58) Field of Classification Search
CPC ..... H04W 72/04; H04W 52/08; H04W 52/10; H04W 72/14; H04W 16/28; H04W 76/27;
(Continued)

(56) References Cited

U.S. PATENT DOCUMENTS

2013/0142113 A1*  6/2013  Fong .................. H04W 72/02
                                                370/328
2020/0267663 A1*  8/2020  Xu ..................... H04W 52/242

OTHER PUBLICATIONS

Motorola Mobility, et al., "Remaining Details on CA-Related NR UL Power Control", 3GPP Draft, 3GPP TSG RAN WG1 #92bis, R1-1807279-POWER-CONTROL-CA-FINAL, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 12, 2018 (May 12, 2018), XP051463010, 6 Pages, Retrieved from the Internet: URL: http://www.3gpp.org/ftp/tsg%5Fran/WG1%5FRL1/TSGR1%5F93/Docs [retrieved on May 12, 2018] Sections 1, 2.
(Continued)

*Primary Examiner* — Tu X Nguyen
(74) *Attorney, Agent, or Firm* — Qualcomm Incorporated

(57) ABSTRACT

Aspects relate to wireless communication on multiple component carriers. In some examples, a user equipment (UE) may apply pathloss reference signal information received via a medium access control-control element (MAC-CE) to a set of component carriers for transmitting uplink information. Examples of such transmissions of uplink information include a physical uplink shared channel transmission, a physical uplink control channel transmission, and a sounding reference signal transmission. In some examples, the UE may identify the set of component carriers based on a component carrier identified by the MAC-CE.

28 Claims, 16 Drawing Sheets

(51) Int. Cl.
H04B 17/309 (2015.01)
H04L 5/00 (2006.01)
H04L 25/02 (2006.01)
H04W 52/14 (2009.01)

(52) U.S. Cl.
CPC ....... *H04L 25/0226* (2013.01); *H04W 52/146* (2013.01); *H04W 80/02* (2013.01)

(58) Field of Classification Search
CPC ..... H04W 80/02; H04W 72/02; H04W 74/00; H04B 17/309
See application file for complete search history.

(56) References Cited

OTHER PUBLICATIONS

Ericsson: "Open Issues on PUCCH on SCells," 3GPP Draft, 3GPP TSG-RAN WG2 #89bis, R2-151490—Open Issues On Pucch on SCells, 3rd Generation Partnership Project (3GPP), Mobile Competence Centre, 650, Route Des Lucioles, F-06921, Sophia-Antipolis Cedex, France, vol. RAN WG2, No. Bratislava, Slovakia, Apr. 20, 2015-Apr. 24, 2015, Apr. 19, 2015 (Apr. 19, 2015), XP050936416, 4 pages, Retrieved from the Internet: URL: http://www.3gpp.org/ftp/Meetings_3GPP_SYNC/RAN2/Docs/ [retrieved on Apr. 19, 2015] Sections 1, 2.3.
International Search Report and Written Opinion —PCT/US2020/056125—ISA/EPO—dated Feb. 1, 2021.

Motorola Mobility, et al., "Remaining Details on CA-Related NR UL Power Control", 3GPP Draft, 3GPP TSG RA WG1 #92bis, R1-1807279-Power-Control-CA-Final, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 12, 2018 (May 12, 2018), XP051463010, 6 Pages, Retrieved from the Internet: URL: http://www.3gpp.org/ftp/tsg%5Fran/WG1%5FRL1/TSGR1%5F93/Docs [retrieved on May 12, 2018] Sections 1, 2.
NTT Docomo, Inc: "Discussion on Multi-Beam Enhancement", 3GPP Draft, 3GPP TSG RAN WG1 #98bis, R1-1911185, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 4, 2019 (Oct. 4, 2019), XP051789957, pp. 1-20, Retrieved from the Internet: URL: http://www.3gpp.org/ftp/tsg_ran/WG1_RL1/TSGR1_98b/Docs/R1-1911185.zip R1-1911185.docx [retrieved on Oct. 4, 2019-] Section 3.3, p. 4, paragraph [03.3]—p. 5, pp. 3-4, Section 3.2.
Qualcomm Incorporated: "Correction on New DL MIMO MAC CE," 3GPP Draft, 3GPP TSG-RAN WG2 Meeting #109bis-e, R2-2003252, 3rd Generation Partnership Project (3GPP), Mobile Competence Centre, 650, Route Des Lucioles, F-06921, Sophia-Antipolis Cedex, France, vol. RAN WG2, No. Online Meeting, Apr. 20, 2020-Apr. 30, 2020, Apr. 10, 2020 (Apr. 10, 2020), XP051871250, 9 pages, Retrieved from the Internet: URL: https://ftp.3gpp.org/tsg_ran/WG2_RL2/TSGR2_109bis-e/Docs/R2-2003252.zip R2-2S03252 Correction on new DL MIMO MAC CE v2.docx- [retrieved on Apr. 10, 2020] Sections 1, 2.1.

* cited by examiner

PATHLOSS REFERENCE SIGNAL INFORMATION FOR MULTIPLE COMPONENT CARRIERS

CROSS-REFERENCE TO RELATED APPLICATIONS

The present application for patent claims priority to and the benefit of pending U.S. Provisional Application No. 62/923,469, titled "SIMULTANEOUS PATHLOSS RS UPDATE FOR MULTIPLE CCS/BWPS" filed Oct. 18, 2019, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to updating pathloss reference signal information across wireless communication carriers.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station.

A UE may transmit reference signals to enable a base station to estimate a wireless communication channel between the UE and the base station. For example, a UE may generate a sounding reference signal (SRS) based on a known sequence and transmit the SRS on resources allocated by the base station. The base station may then estimate the quality of an uplink channel from the UE based on the SRS and/or determine other information based on the SRS. The base station may use this channel estimate or other information to, for example, more efficiently allocate resources and/or specify transmission parameters for communication over one or more channels.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment is disclosed. The method can include receiving at least one medium access control-control element (MAC-CE) that includes pathloss reference signal information. The method may also include identifying a plurality of component carriers and applying the pathloss reference signal information to the plurality of component carriers. The method may further include transmitting uplink information via the plurality of component carriers according to the applying the pathloss reference signal information to the plurality of component carriers.

Another example provides a user equipment for a wireless communication network. The user equipment includes a transceiver configured to communicate with a radio access network, a memory, and a processor coupled to the transceiver and the memory. The processor and the memory can be configured to receive via the transceiver at least one medium access control-control element (MAC-CE) that includes pathloss reference signal information. The processor and the memory can be further configured to identify a plurality of component carriers and apply the pathloss reference signal information to the plurality of component carriers. The processor and the memory also may be configured to transmit uplink information via the plurality of component carriers according to application of the pathloss reference signal information to the plurality of component carriers.

Another example provides a user equipment for a wireless communication network. The user equipment includes means for receiving at least one medium access control-control element (MAC-CE) that includes pathloss reference signal information, means for identifying a plurality of component carriers, means for applying the pathloss reference signal information to the plurality of component carriers, and means for transmitting uplink information via the plurality of component carriers according to the applying the pathloss reference signal information to the plurality of component carriers.

Another example provides an article of manufacture for use by a user equipment that includes a computer-readable medium having stored therein instructions executable by one or more processors of the user equipment to receive at least one medium access control-control element (MAC-CE) that includes pathloss reference signal information, identify a plurality of component carriers, apply the pathloss reference signal information to the plurality of component carriers, and transmit uplink information via the plurality of component carriers according to application of the pathloss reference signal information to the plurality of component carriers.

One or more of the following features may be applicable to any of the method, the apparatuses, and the computer-readable medium of the preceding paragraphs. The uplink information may include a physical uplink shared channel transmission, a physical uplink control channel transmission, or a sounding reference signal transmission. Identifying the plurality of component carriers may include receiving a plurality of lists of component carriers and selecting one list of the plurality of lists of component carriers that includes a first component carrier identified by the MAC-CE. The first component carrier identified by the MAC-CE may include a serving cell for which the MAC-CE applies. The plurality of lists of component carriers may be received via radio resource control signaling or MAC-CE signaling.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
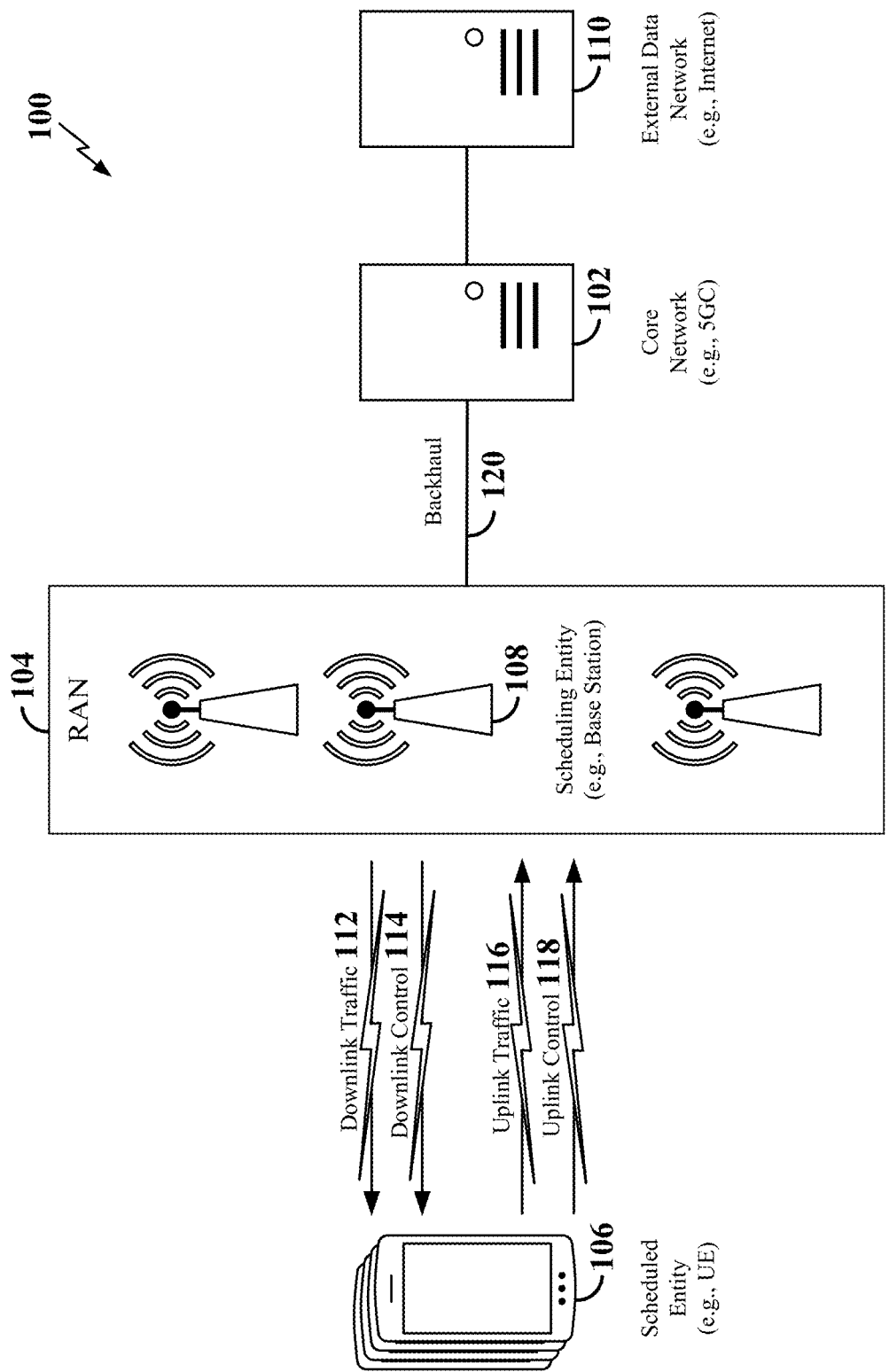
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to wireless communication on multiple component carriers (CCs). In some examples, a user equipment (UE) may apply pathloss reference signal information received via a medium access control-control element (MAC-CE) to a set of component carriers for transmitting uplink information. Examples of such transmissions of uplink information include a physical uplink shared channel (PUSCH) transmission, a physical uplink control channel (PUCCH) transmission, and a sounding reference signal (SRS) transmission.

A base station may configure the UE with an indication of different sets of component carriers that the UE may use to communicate with the base station. In some examples, the sets of component carriers may be mutually exclusive in that a component carrier that belongs to one set of component carriers does not belong to any other set of component carriers.

In some examples, the UE may identify a particular set of component carriers based on a component carrier identified by the MAC-CE. For example, the MAC-CE may include an identifier of the serving component carrier (e.g., the serving cell) for the UE. Thus, the UE can identify the particular set of component carriers from the sets of component carriers by determining which set includes the component carrier identified by the MAC-CE.

The UE may apply pathloss reference signal information included in the MAC-CE to uplink transmissions on the identified set of component carriers. For example, the pathloss reference signal information may include a reference signal identifier of a reference signal to be used by the UE to determine the pathloss experienced by a signal transmitted over a channel between the UE and the base station. The UE may then use this pathloss to calculate the transmit power to be used for uplink transmissions on the identified set of component carriers.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below; e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
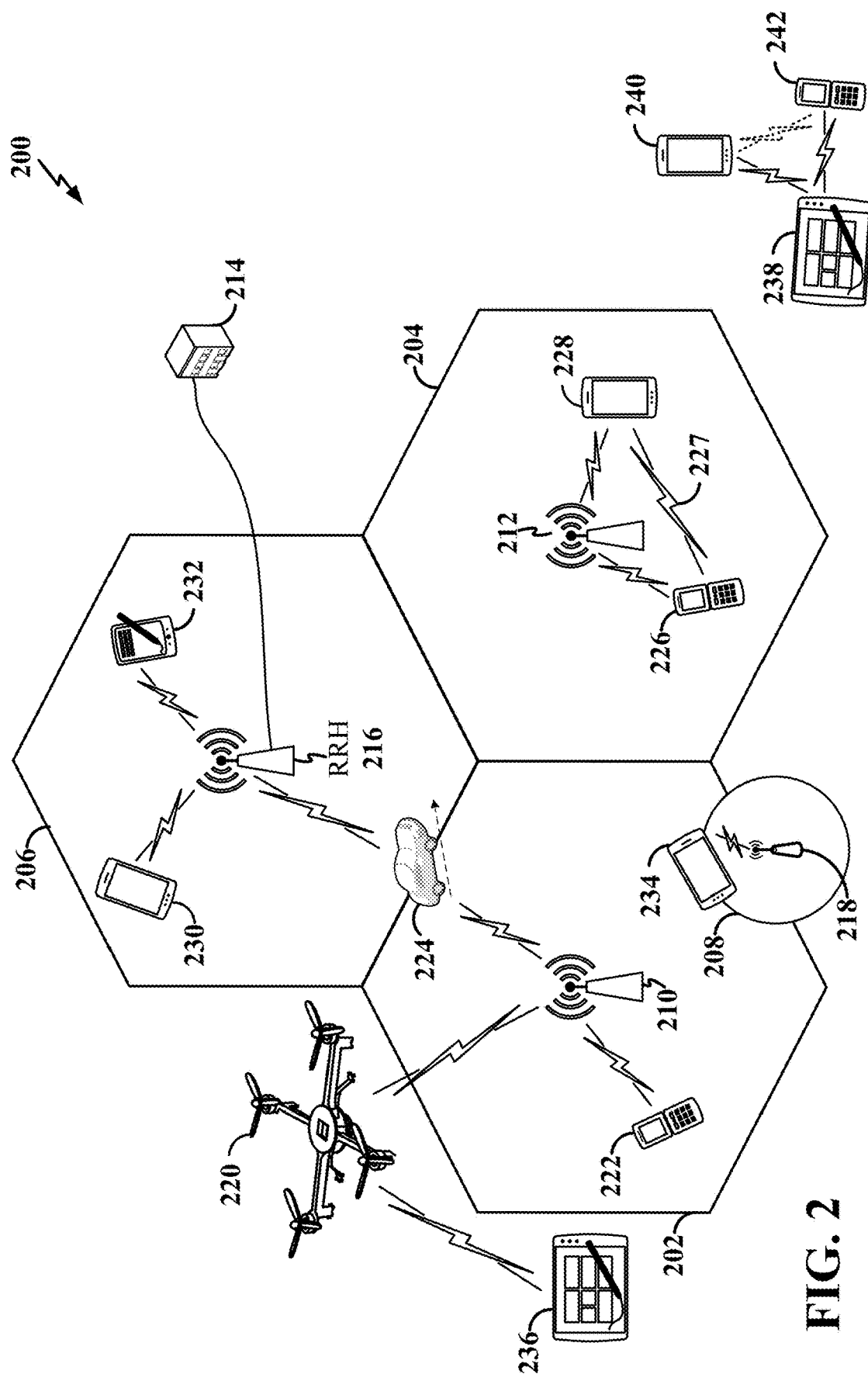
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
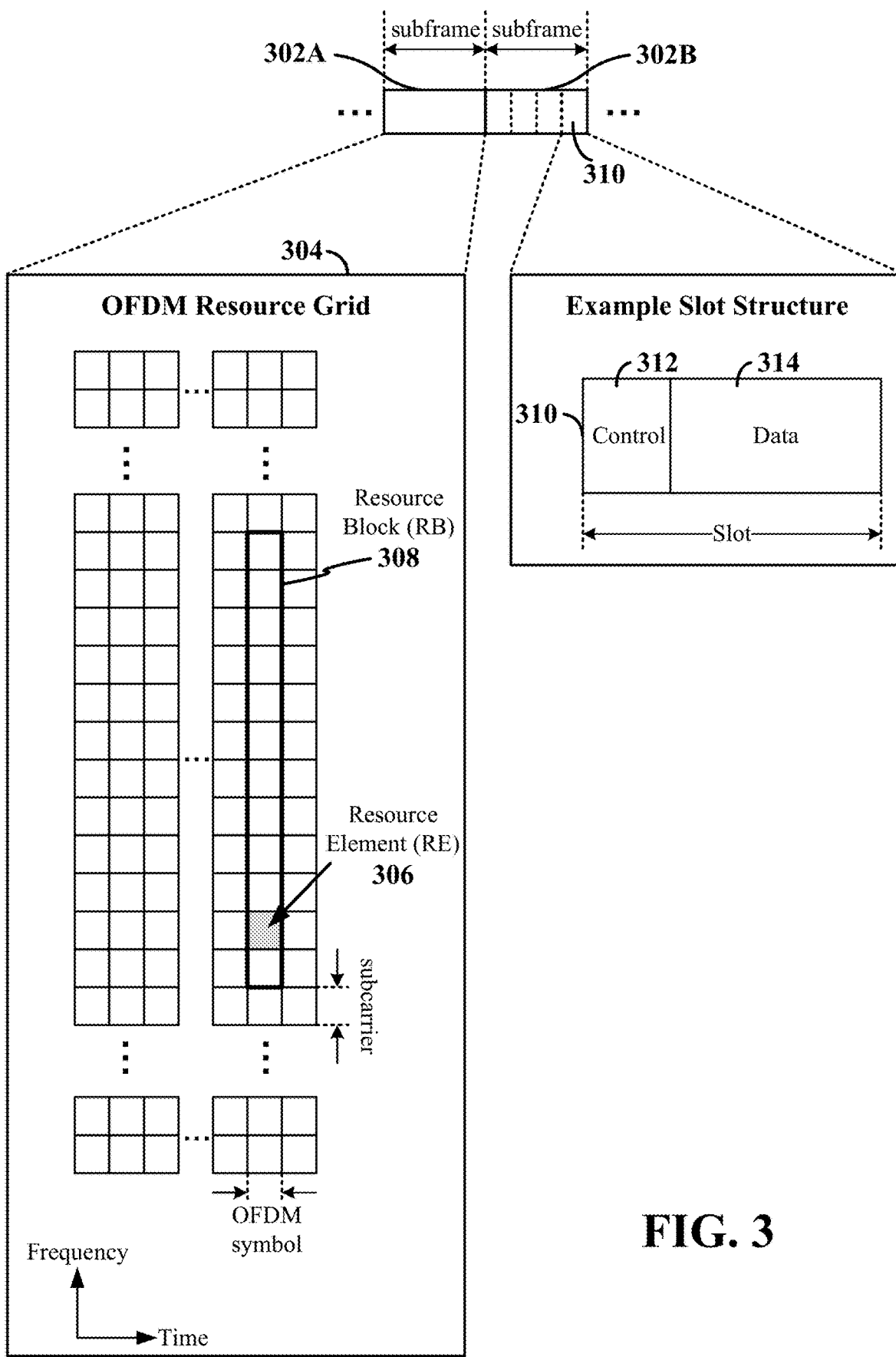
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH; and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random access search space, and uplink configuration information. Two specific examples of coresets include PDCCH CORESET 0 and CORESET 1.

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
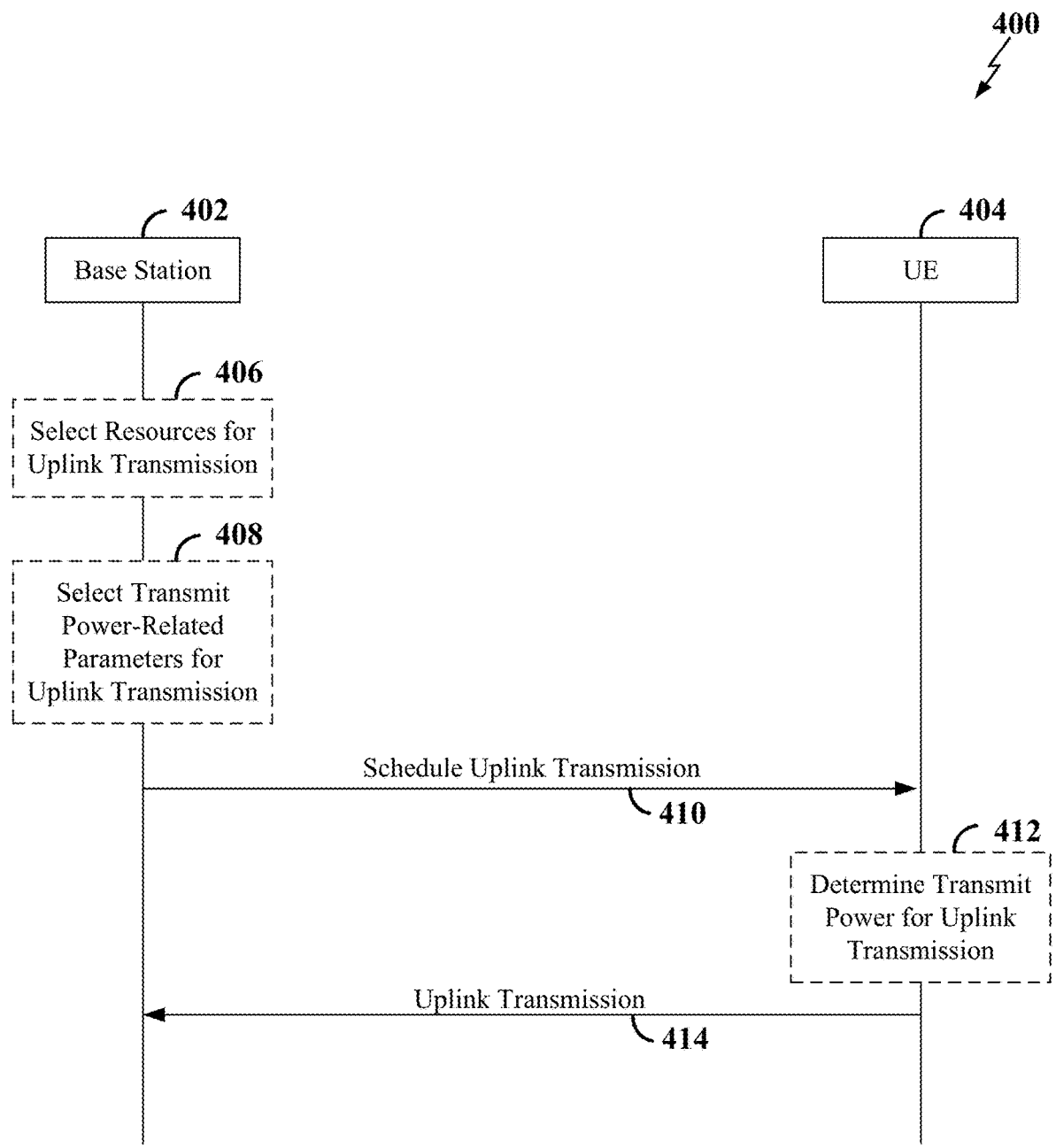
FIG. 4 is a signaling diagram illustrating an example of signaling for scheduling an uplink transmission according to some aspects.

FIG. 4 is a signaling diagram 400 illustrating an example of resource scheduling for an uplink transmission in a wireless communication system including a base station (BS) 402 and a UE 404. In some examples, the BS 402 may correspond to any of the base stations or scheduling entities shown in any of FIGS. 1, 2, 5, and 6. In some examples, the UE 404 may correspond to any of the UEs or scheduled entities shown in any of FIGS. 1, 2, 5, 6, and 10.

At step 406 of FIG. 4, the BS 402 selects resources for an uplink transmission. For example, the BS 402 may allocate resources to be used by the UE 404 for a PUSCH transmission, for a PUCCH transmission, or for an SRS transmission.

At step 408, the BS 402 selects transmit power-related parameters for the uplink transmission. For example, the BS 402 may select one or more parameters that the UE 404 uses to calculate a PUSCH transmission power in a PUSCH transmission occasion, a PUCCH transmission power in a PUCCH transmission occasion, or an SRS transmission power in an SRS transmission occasion.

At step 410, the BS 402 schedules the uplink transmission. For example, the BS 402 may send a DCI to the UE 404 on a PDCCH, where the DCI specifies the resources and other information to be used by the UE 404 for the uplink transmission.

At step 412, the UE 404 determines the transmit power to be used for the uplink transmission. In some aspects, this determination may be based on information the BS 402 provided to the UE 404 (e.g., the information from step 408).

At step 414, the UE 404 transmits the uplink transmission on the scheduled resources. Thus, in some examples, the UE 404 may transmit a PUSCH transmission, a PUCCH transmission, or an SRS transmission.

An SRS transmission may involve a UE transmitting SRSs that a base station may use for various purposes including, for example, channel estimation, positioning, codebook generation, and beam selection. For example, a UE may transmit SRSs to a base station over a specified bandwidth to enable the base station to estimate the uplink channel over that bandwidth. In this way, the base station may better schedule uplink transmissions from the UE (e.g., the base station may select the frequency band and transmission parameters the UE is to use for an uplink transmission).

A base station may transmit SRS configuration information to a UE that specifies the SRS resources and other parameters to be used by a UE to transmit SRSs. For example, a base station may configure one or more SRS resource sets for a UE. In some examples, a UE may use different resource sets for transmitting on different symbols. A defined number of antenna ports may be used for each SRS resource. In some examples, a given antenna port may correspond to a particular set of antenna elements and/or other beamforming parameters (e.g., signal phases and/or amplitudes).

As mentioned above, a base station may communicate with a UE using multiple antennas. For example, a base station may transmit parallel data streams over respective antennas to increase throughput (e.g., as opposed to transmitting the data streams sequentially over the same antenna). Additionally, or alternatively, a base station may simultaneously transmit a given data stream over multiple antennas (e.g., to increase the diversity of the transmissions).

5G-NR networks may support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

Figure 5:
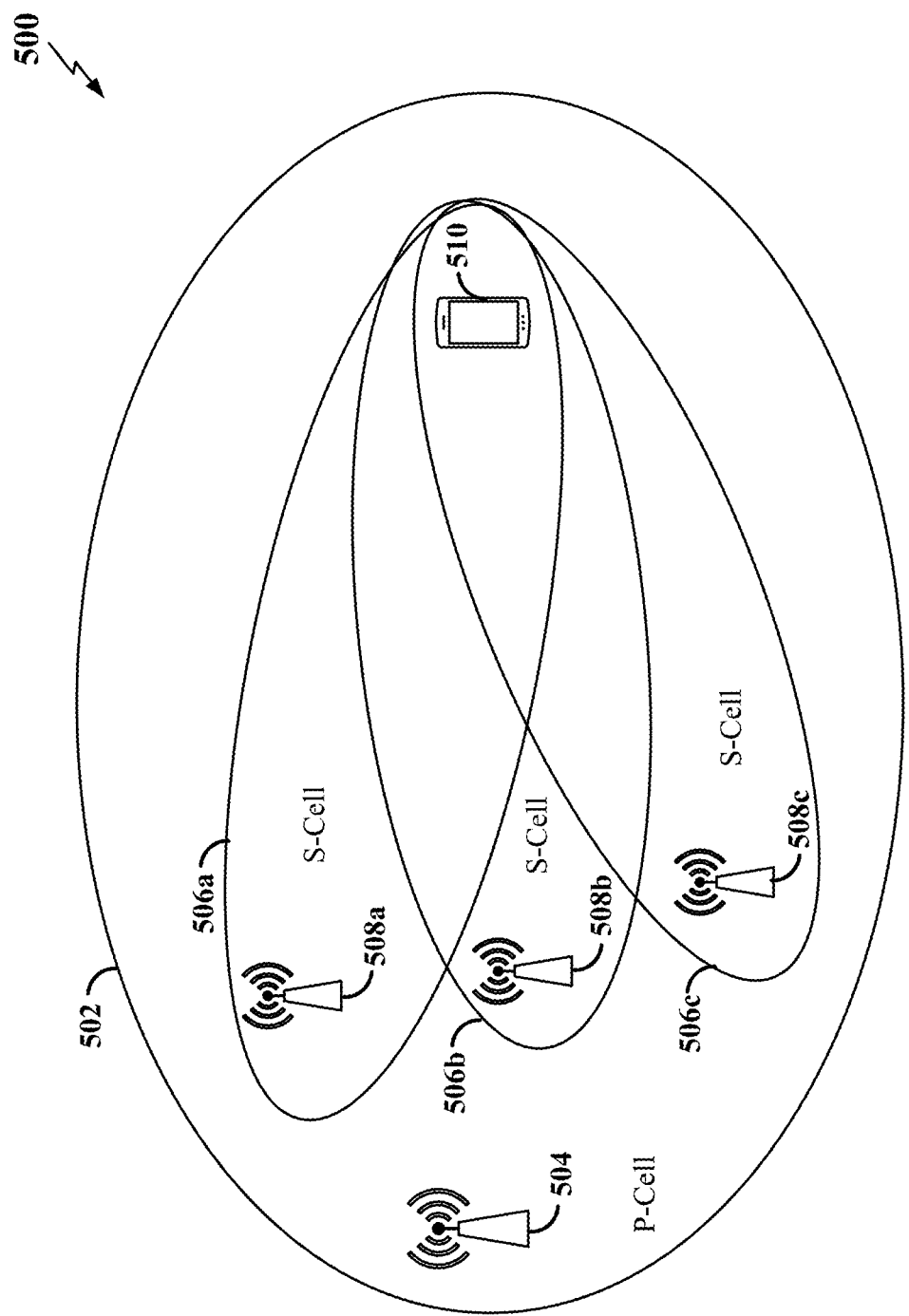
FIG. 5 is a conceptual illustration of an example of wireless communication via multiple radio frequency (RF) carriers according to some aspects.

FIG. 5 is a conceptual illustration of a wireless communication system that shows a base station (BS) and a user equipment (UE) communicating via multiple carriers according to some aspects of the disclosure. In particular, FIG. 5 shows an example of a wireless communication system 500 that includes a primary serving cell (PCell) 502 and one or more secondary serving cells (SCells) 506a, 506b, and 506c. The PCell 502 may be referred to as the anchor cell that provides a radio resource control (RRC) connection to a UE 510. In some examples, the PCell and the SCell may be co-located (e.g., different TRPs at the same location).

One or more of the SCells 506a-506c may be activated or added to the PCell 502 to form the serving cells serving the UE 510. Each serving cell corresponds to a component carrier (CC). The CC of the PCell 502 may be referred to as a primary CC, and the CC of an SCell 506a-506c may be referred to as a secondary CC. The PCell 502 and one or more of the SCells 506 may be served by a respective base station 504 and 508a-508c or scheduling entity similar to those illustrated in any of FIGS. 1, 2, 4, and 6. In the example shown in FIG. 5, SCells 506a-506c are each served by a respective base station 508a-508c or TRPs of the base station 504, each supporting a different carrier.

In some examples, the PCell 502 may utilize a first radio access technology (RAT), such as LTE, while one or more of the SCells 506 may utilize a second RAT, such as 5G-NR. In this example, the multi-cell transmission environment may be referred to as a multi-RAT-dual connectivity (MR- DC) environment. One example of MR-DC is Evolved-Universal Terrestrial Radio Access Network-New Radio dual connectivity (EN-DC) mode that enables a UE to simultaneously connect to an LTE base station and a NR base station to receive data packets from and send data packets to both the LTE base station and the NR base station.

In some examples, the PCell 502 may be a low band cell, and the SCells 506 may be high band cells. A low band (LB) cell uses a component carrier in a frequency band lower than that of the high band cells. For example, the high band cells may use millimeter wave (mmW) component carriers, and the low band cell may use a component carrier in a band (e.g., sub-6 GHz band) lower than mmW. In general, a cell using a mmW component carrier can provide greater bandwidth than a cell using a low band component carrier. In addition, when using a frequency carrier that is above 6 GHz (e.g., mmW), beamforming may be used to transmit and receive signals in some examples.

In some cases, the use of multiple antennas for carrier aggregation or other multiple carrier schemes may be based on the use of one or more antenna ports. An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission).

Some antenna ports may be referred to as being quasi co-located, meaning that the spatial parameters of a transmission on one antenna port may be inferred from the spatial parameters of another transmission on a different antenna port. Accordingly, a receiving device (e.g., a UE) may be able to perform channel estimation for demodulating data or control information received on a first set of antenna ports based on reference signals received on a second set of antenna ports that are quasi co-located with the first set of antenna ports. Thus, a quasi co-location (QCL) relationship between antenna ports may improve the chances that a UE may successfully decode a downlink transmission from a base station. In some cases, a base station may transmit to a UE an indication of which antenna ports are quasi co-located such that the UE may be able to identify additional reference signals to use for channel estimation.

In some aspects, a base station may configure a set of transmission configuration indication (TCI) states to use to indicate to a UE one or more QCL relationships between antenna ports used for transmitting downlink signals to the UE. Each TCI state may be associated with a set of reference signals (e.g., synchronization signal blocks (SSBs) or different types of channel state information reference signals (CSI-RSs)), and the TCI state may indicate a QCL relationship between antenna ports used to transmit the set of reference signals and antenna ports used to transmit data or control information to a UE. As such, when a UE receives an indication of a particular TCI state from a base station (e.g., in DCI), the UE may identify that antenna ports used to transmit the reference signals associated with the TCI state are quasi co-located with antenna ports used to transmit data and control information to the UE. The UE may use the reference signals associated with the TCI state to perform channel estimation for demodulating data or control information received from the base station.

To limit the overhead associated with indicating a TCI state to a UE, a base station may be configured to indicate a limited number of TCI states to a UE. For example, the base station may configure M (e.g., 8) TCI states corresponding to different QCL relationships between antenna ports used for downlink communication with a UE, and the base station may use an N-bit indicator (e.g., a 3-bit indicator) to indicate a TCI state to a UE (e.g., where M≥2N). In some cases, however, after a period of time, the originally configured TCI states may no longer correspond to suitable QCL relationships between antenna ports used for transmitting downlink signals to a UE. In such cases, a base station may be configured to use radio resource control (RRC) signaling or a medium access control (MAC) control element (MAC-CE) to update the TCI states used to indicate QCL relationships between antenna ports to a UE.

The disclosure relates in some aspects to power control for component carriers. A base station (e.g., a gNB) may send pathloss reference signal identifiers to a UE that the UE can use to determine pathloss for an uplink transmission. Specifically, the UE can determine a pathloss based on a pathloss reference signal corresponding to a particular pathloss reference signal identifier. The UE may then determine the transmit power to use for the uplink transmission based on this pathloss. The different pathloss reference signal identifiers may correspond to, for example, different expected uplink beams. A base station may send a MAC-CE to a UE to update the pathloss reference signal (RS) corresponding to an SRS resource indicator (SRI) for a PUSCH transmission, update the pathloss RS corresponding to a PUCCH transmission, and/or update the pathloss RS for an SRS resource set for an SRS transmission.

In some examples, a pathloss RS (which may be referred to as a pathloss reference RS) for PUSCH can be activated/updated via a MAC CE. The MAC CE message can activate and/or update (activate/update) the value of PUSCH-PathlossReferenceRS-Id corresponding to sri-PUSCH-PowerControlId. Such a correspondence (mapping) is described in 3GPP TS 38.331 v15.9.0 by SRI-PUSCH-PowerControl, in which the linkage is between sri-PUSCH-PowerControlId and PUSCH-PathlossReferenceRS-Id.

In some examples, a pathloss reference RS for aperiodic SRS and/or semi-persistent SRS (AP-SRS/SP-SRS) can be activated/updated via a MAC CE. A UE can be configured with multiple pathloss RSs by RRC signaling and one of them can be activated/updated via the MAC CE for an SRS resource set.

The disclosure relates in some aspects to simultaneously applying a pathloss RS update received via a MAC-CE across multiple component carriers. In some aspects, this approach may advantageously save overhead and latency since a single MAC-CE (as opposed to multiple messages) may activate and/or update multiple component carriers.

The disclosure relates in some aspects to a single MAC-CE activating the same pathloss RS ID for a given SRI-PUSCH-PowerControl-ID for a PUSCH transmission on multiple CCs/BWPs. For example, a MAC CE message can activate/update the value of PUSCH-PathlossReferenceRS-Id corresponding to a given sri-PUSCH-PowerControlId, and the value is applied to multiple CCs/BWPs in an applied component carrier list.

In some examples, up to "X" lists of applied component carriers can be configured by RRC signaling (or MAC-CE signaling) per UE, and the selected applied component carrier list may be determined by the indicated component carrier in a MAC CE (e.g., the list containing the indicated component carrier). Here, the UE may expect that there is no overlapped component carrier in the multiple RRC-configured lists of component carriers. In other words, a particular component carrier will appear in only one component carrier list.

The disclosure relates in some aspects to a single MAC-CE activating the same pathloss RS ID for a given SRS resource set ID on multiple CCs/BWPs. For example, a UE can be configured with multiple pathloss RS IDs by RRC signaling and one of these RS IDs can be activated/updated via the MAC CE for a given SRS resource set ID. The activated/updated pathloss RS ID is then applied to multiple CCs/BWPs in an applied component carrier list.

Again, in some examples, up to "X" lists of applied component carriers can be configured by RRC signaling (or MAC-CE signaling) per UE, and the selected applied component carrier list may be determined by the indicated component carrier in the MAC CE (e.g., the CC list containing the component carrier indicated by the MAC-CE is selected). Here, the UE may expect that there is no overlapping of component carriers in the multiple RRC-configured lists of component carriers.

The above multi-component carrier approach may be similar in some aspects to a scenario where a single MAC-CE may simultaneously update the same set of TCI state IDs or spatial relation information (Spatial Relation Info) across multiple CCs/BWPs, indicated by an applicable list of component carriers configured by RRC signaling. When a set of TCI-state IDs for PDSCH are activated by a MAC CE for a set of CCs/BWPs at least for the same band, where the applicable list of component carriers is indicated by RRC signaling, the same set of TCI-state IDs may be applied for all the BWPs in the indicated component carriers. When a TCI-state ID is activated for a CORESET by a MAC CE for a set of CCs/BWPs at least for the same band, where the applicable list of component carriers is indicated by RRC signaling, the TCI-state ID may be applied for the CORESET(s) with the same CORESET ID for all the BWPs in the indicated component carriers. When a Spatial Relation Info is activated for a SP/AP SRS resource by a MAC CE for a set of CCs/BWPs at least for the same band, where the applicable list of component carriers is indicated by RRC signaling, the Spatial Relation Info may be applied for the SP/AP SRS resource(s) with the same SRS resource ID for all the BWPs in the indicated component carriers. In some aspects, inter-band CA for this feature may be supported. In some aspects, a device may indicate the applicable list of bands for the feature of a single MAC-CE activating the same set of PDSCH TCI state IDs for multiple CCs/BWPs. In some aspects, this may at least apply to the single TRP case. Different combinations of component carriers can be configured by RRC signaling and different UE capabilities may be supported.

This scenario may also involve indicating the feature that a single MAC-CE simultaneously updates the same set of TCI state IDs or spatial relation information across multiple CCs/BWPs. In some aspects, this feature is indicated by an applicable list of component carriers. This list may be configured by RRC signaling, MAC-CE signaling, or some other type of signaling. If the (or any) applicable list is configured, the above feature is enabled. That is, the same set of TCI state IDs or spatial relation information indicated by the single MAC-CE is applied to all CCs/BWPs in the applicable list. Otherwise, the above feature is disabled. That is, in some examples, the same set of TCI state IDs or spatial relation information are only applied to the CC/BWP indicated by this MAC-CE.

Figure 6:
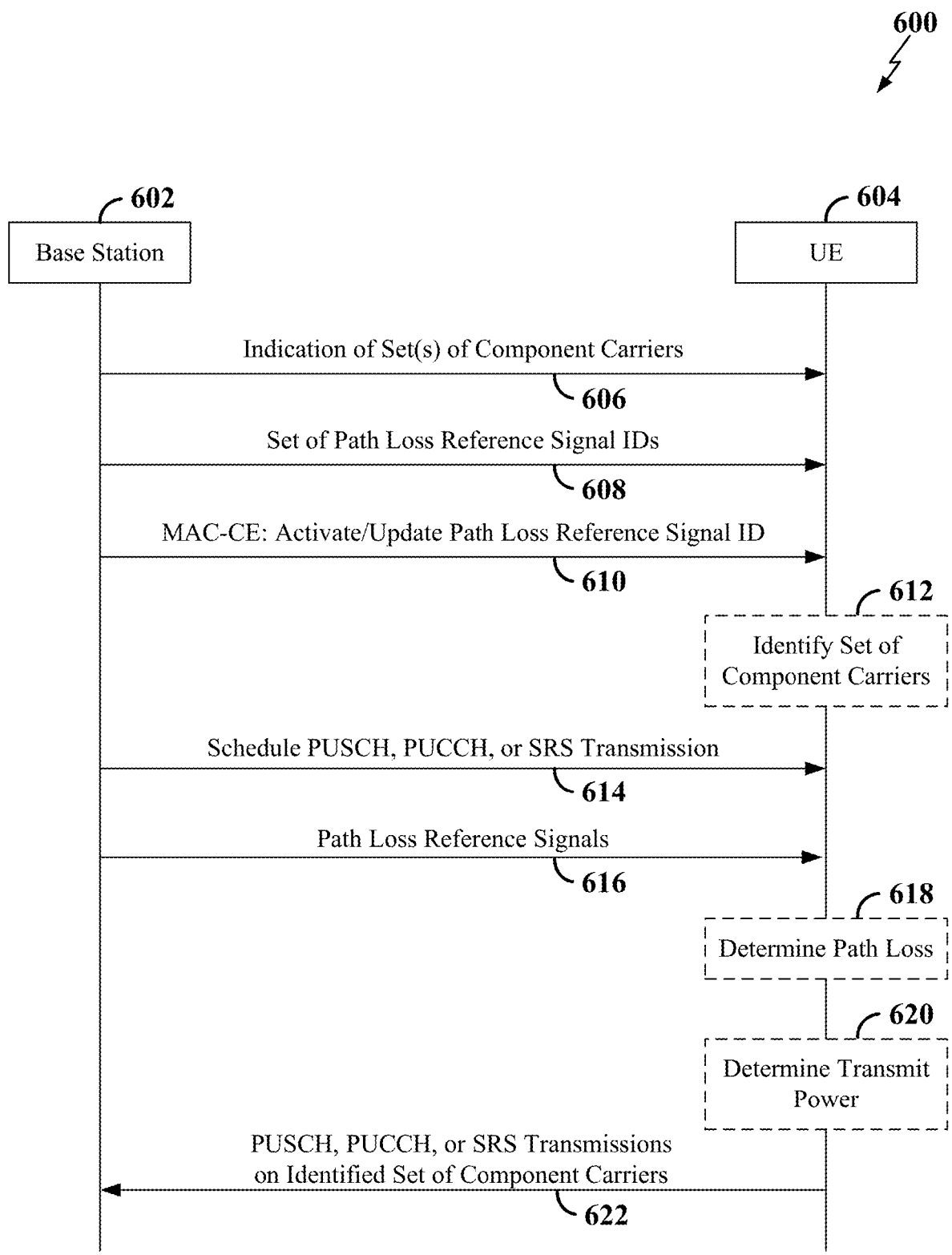
FIG. 6 is a signaling diagram illustrating an example of signaling for applying pathloss reference signal information for an uplink transmission on multiple component carriers according to some aspects.

FIG. 6 is a signaling diagram 600 illustrating an example of power control for component carriers in a wireless communication system including a base station (BS) 602 and a UE 604. In some examples, the BS 602 may correspond to any of the base stations or scheduling entities shown in any of FIGS. 1, 2, 4, and 5. In some examples, the UE 604 may correspond to any of the UEs or scheduled entities shown in any of FIGS. 1, 2, 4, 5, and 10.

At step 606 of FIG. 6, the BS 602 sends an indication of one or more sets of component carriers to the UE 604. For example, the BS 602 may transmit an RRC message that identifies several lists of component carriers.

At step 608, the BS 602 sends an indication of a set of pathloss reference signal identifiers (IDs) to the UE 604. For example, the BS 602 may an RRC message that includes a list of pathloss reference signal identifiers (IDs) associated with pathloss RSs used by the BS 602.

At step 610, the BS 602 sends a MAC-CE to the UE 604. The MAC-CE includes an indication to activate and/or update a pathloss RS ID. For example, the MAC-CE may include an identifier of a particular pathloss RS to be used by the UE for calculating transmit power for an uplink transmission. In addition, the MAC-CE may include an identifier of a particular component carrier (e.g., the component carrier for which the MAC-CE applies). Advantageously, the BS 602 may use the MAC-CE to activate/update a pathloss RS ID at a faster rate than may be achieved using RRC signaling to activate update a pathloss RS ID.

At step 612, the UE 604 identifies a set of component carriers. In some examples, the UE 604 may determine whether the UE 604 has been configured with a list of component carriers. In some examples, the UE 604 identifies one set of component carriers from a plurality of sets of component carriers. For example, the UE 604 may determine which set of component carriers includes the component carrier identified by the MAC-CE received at step 610.

At step 614, the BS 602 schedules a PUSCH, PUCCH, or SRS transmission by the UE 604. For example, the BS 602 may send a DCI to the UE 604 that schedules the transmission.

At step 616, the BS 602 transmits pathloss reference signals. For example, the BS 602 may transmit a pathloss reference signal identified by the MAC-CE of step 610.

At step 618, the UE 604 determines the pathloss over a channel between the base station 602 and the UE 604. For example, the UE 604 may determine the pathloss to which the received pathloss reference signal (step 616) was subjected via a path from the base station 602 to the UE 604.

At step 620, the UE 604 determines the transmit power to be used to transmit the component carriers identified at step 612. For example, the UE 604 may calculate the transmit power for a PUSCH transmission, a PUCCH transmission, or an SRS transmission according to a transmit power formula that is based, in part, on the pathloss determined at step 618.

At step 622, the UE 604 transmits the PUSCH transmission, the PUCCH transmission, or the SRS transmission via the identified set of component carriers. This transmission may use the transmit power determined at step 620.

Figure 7:
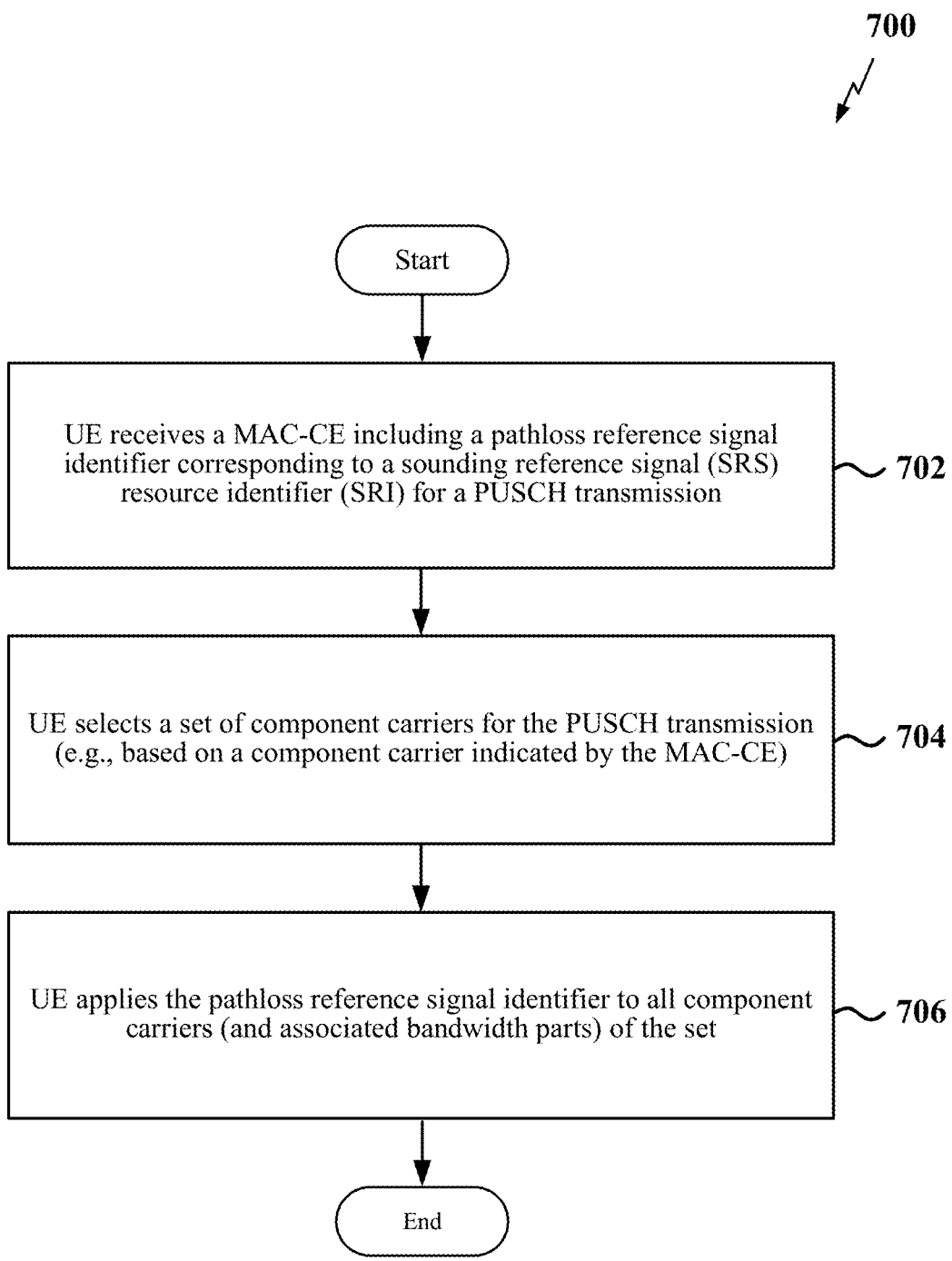
FIG. 7 is a flow chart illustrating an example of a process for applying a pathloss reference signal identifier for a physical uplink shared channel (PUSCH) transmission to multiple component carriers according to some aspects.
Figure 8:
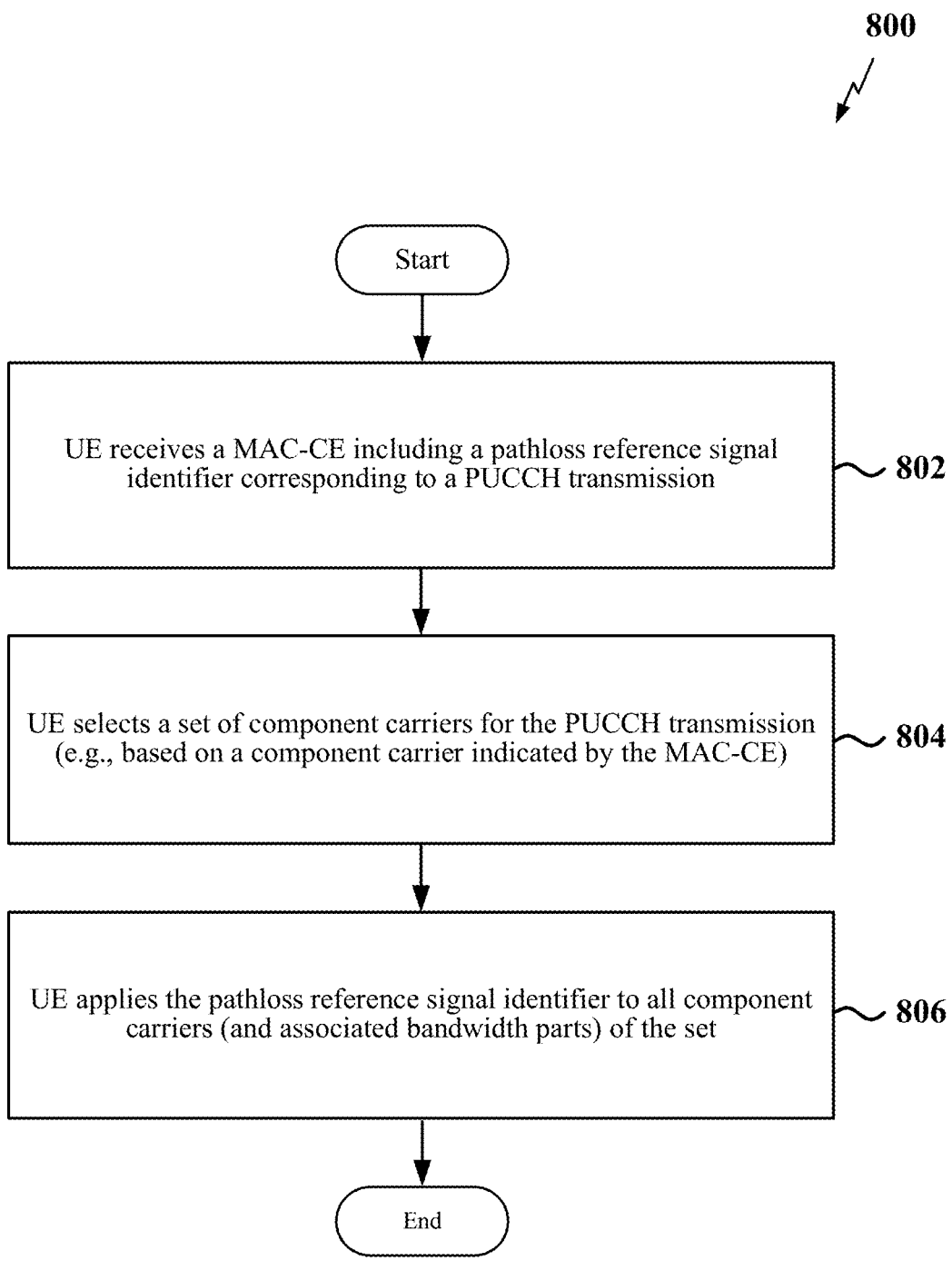
FIG. 8 is a flow chart illustrating an example of a process for applying a pathloss reference signal identifier for a physical uplink control channel (PUCCH) transmission to multiple component carriers according to some aspects.
Figure 9:
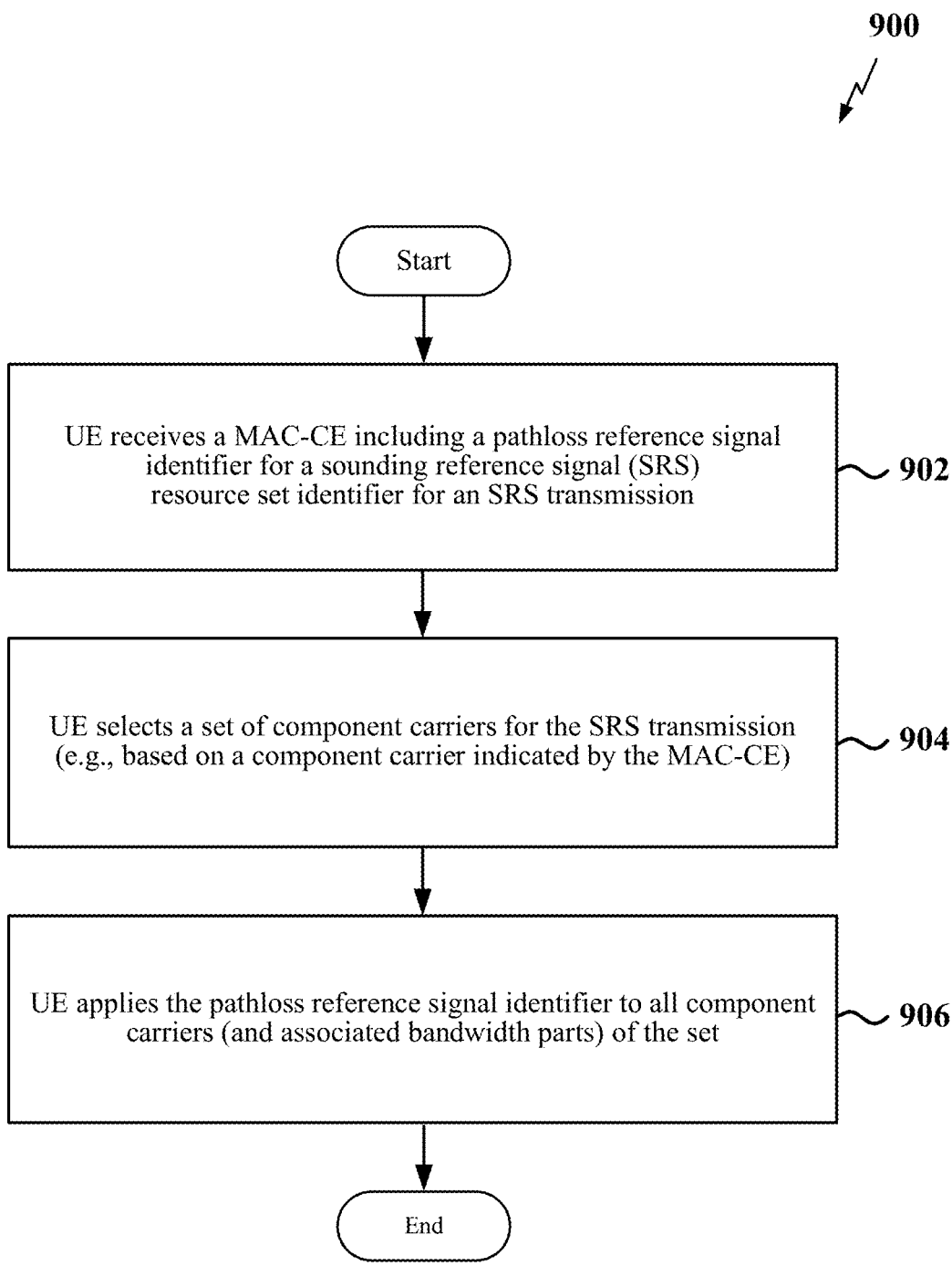
FIG. 9 is a flow chart illustrating an example of a process for applying a pathloss reference signal identifier for a sounding reference signal (SRS) transmission to multiple component carriers according to some aspects.

As mentioned above, an uplink transmission may be a PUSCH transmission, a PUCCH transmission, or an SRS transmission in some examples. FIGS. 7-9 illustrate examples of applying a pathloss signal identifier to component carriers for each of these uplink transmissions.

FIG. 7 is a flow chart illustrating an example process 700 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 700 may be carried out by the UE 1000 illustrated in FIG. 10. In some examples, the process 700 may be carried out by any suitable apparatus or means for carrying out the functions or algorithm described below.

At block 702, a UE receives a MAC-CE including a pathloss reference signal identifier corresponding to an SRI for a PUSCH transmission. In some examples, the operations of block 702 may correspond to the operations of step 610 of FIG. 6.

At block 704, the UE selects a set of component carriers for the PUSCH transmission. In some aspects, this operation may involve identifying the set of component carriers (e.g., from a previously configured plurality of sets of component carriers) that contains a component carrier indicated by the MAC-CE. In some examples, the component carrier indicated by the MAC-CE is the serving cell for which the MAC-CE applies. In some examples, the operations of block 704 may correspond to the operations of step 612 of FIG. 6.

At block 706, the UE applies the pathloss reference signal identifier to all component carriers (and associated BWPs) of the set for the PUSCH transmission. In some aspects, this approach may advantageously save overhead and latency for PUSCH transmissions since a single MAC-CE (as opposed to multiple messages) may activate and/or update multiple component carriers. In some examples, the operations of block 706 may correspond to the operations of steps 616-622 of FIG. 6.

FIG. 8 is a flow chart illustrating an example process 800 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 800 may be carried out by the UE 1000 illustrated in FIG. 10. In some examples, the process 800 may be carried out by any suitable apparatus or means for carrying out the functions or algorithm described below.

At block 802, a UE receives a MAC-CE including a pathloss reference signal identifier corresponding to a PUCCH transmission. In some examples, the operations of block 802 may correspond to the operations of step 610 of FIG. 6.

At block 804, the UE selects a set of component carriers for the PUCCH transmission. In some aspects, this operation may involve identifying the set of component carriers (e.g., from a previously configured plurality of sets of component carriers) that contains a component carrier indicated by the MAC-CE. In some examples, the component carrier indicated by the MAC-CE is the serving cell for which the MAC-CE applies. In some examples, the operations of block 804 may correspond to the operations of step 612 of FIG. 6.

At block 806, the UE applies the pathloss reference signal identifier to all component carriers (and associated BWPs) of the set for the PUCCH transmission. In some aspects, this approach may advantageously save overhead and latency for PUCCH transmissions since a single MAC-CE (as opposed to multiple messages) may activate and/or update multiple component carriers. In some examples, the operations of block 806 may correspond to the operations of steps 616-622 of FIG. 6.

FIG. 9 is a flow chart illustrating an example process 900 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the UE 1000 illustrated in FIG. 10. In some examples, the process 900 may be carried out by any suitable apparatus or means for carrying out the functions or algorithm described below.

At block 902, a UE receives a MAC-CE including a pathloss reference signal identifier for an SRS resource set for an SRS transmission. In some examples, the operations of block 902 may correspond to the operations of step 610 of FIG. 6.

At block 904, the UE selects a set of component carriers for the SRS transmission. In some aspects, this operation may involve identifying the set of component carriers (e.g., from a previously configured plurality of sets of component carriers) that contains a component carrier indicated by the MAC-CE. In some examples, the component carrier indicated by the MAC-CE is the serving cell for which the MAC-CE applies. In some examples, the operations of block 904 may correspond to the operations of step 612 of FIG. 6.

At block 906, the UE applies the pathloss reference signal identifier to all component carriers (and associated BWPs) of the set for the SRS transmission. In some aspects, this approach may advantageously save overhead and latency for SRS transmissions since a single MAC-CE (as opposed to multiple messages) may activate and/or update multiple component carriers. In some examples, the operations of block 906 may correspond to the operations of steps 616-622 of FIG. 6.

Figure 10:
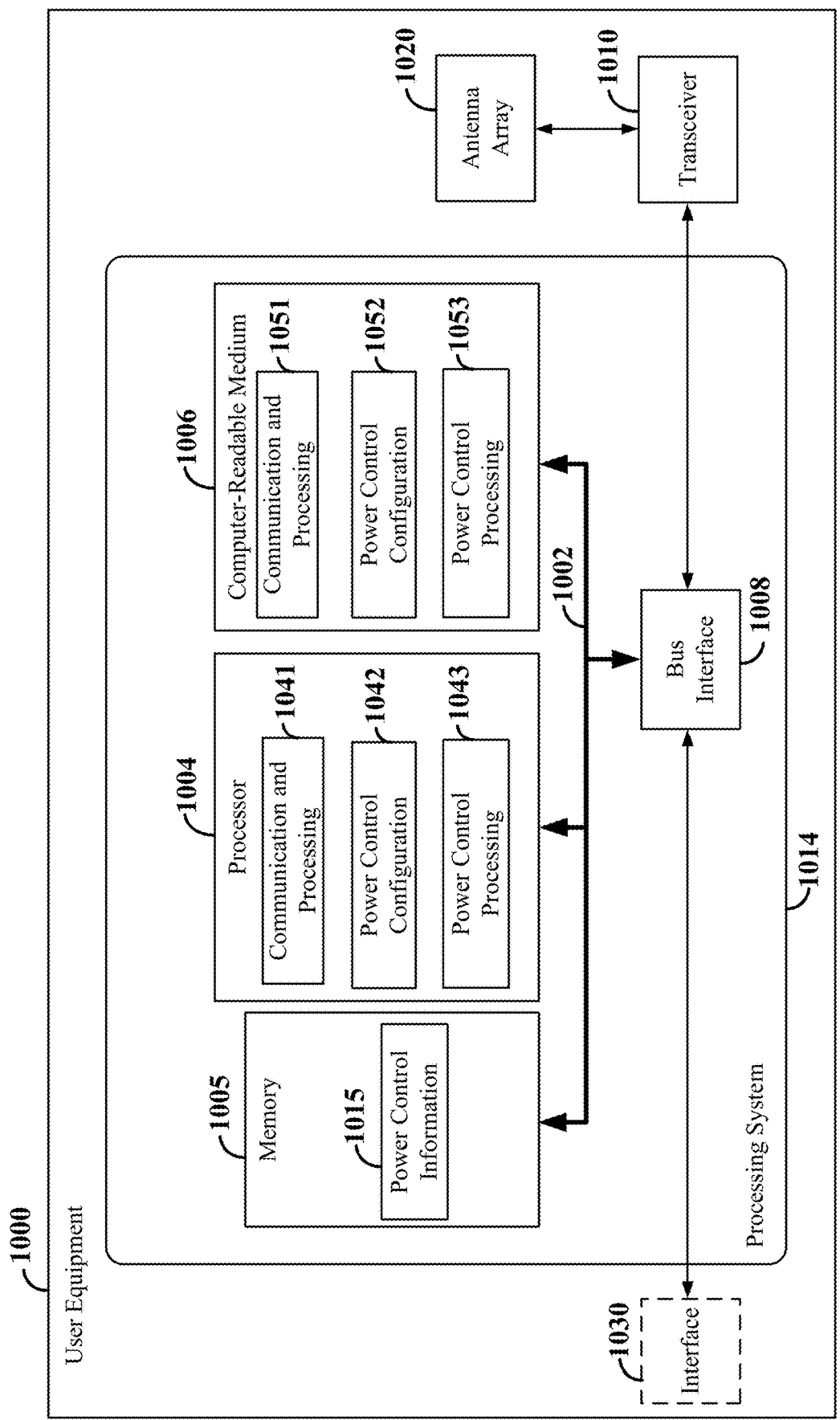
FIG. 10 is a block diagram illustrating an example of a hardware implementation for a user equipment employing a processing system according to some aspects.

FIG. 10 is a block diagram illustrating an example of a hardware implementation for a UE 1000 employing a processing system 1014. For example, the UE 1000 may be a device configured to wirelessly communicate with a base station, as discussed in any one or more of FIGS. 1-9. In some implementations, the UE 1000 may correspond to any of the UEs or scheduled entities shown in any of FIGS. 1, 2, 4, 5, and 6.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. In some examples, the UE may include two or more transceivers 1010, each configured to communicate with a respective network type (e.g., terrestrial or non-terrestrial). The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store power control information (e.g., parameters for a power control algorithm) used by the processor 1004 to control the transmit power of the UE 1000.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIGS. 11-16). In some aspects of the disclosure, the processor 1004, as utilized in the UE 1000, may include circuitry configured for various functions.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains, each configured to process signals in a different RAT (or RAN) type. The communication and processing circuitry 1041 may further be configured to execute communication and processing software 1051 included on the computer-readable medium 1006 to implement one or more functions described herein.

In some examples, the communication and processing circuitry 1041 may be configured to receive and process downlink beamformed signals at a mmWave frequency or a sub-6 GHz frequency via the transceiver 1010 and an antenna array 1020. For example, the communication and processing circuitry 1041 may be configured to receive a respective reference signal (e.g., SSB or CSI-RS) on each of a plurality of downlink beams from the base station during a downlink beam sweep via at least one first antenna panel of the antenna array 1020. The communication and processing circuitry 1041 may further be configured to transmit a beam measurement report to the base station.

In some examples, the communication and processing circuitry 1041 may further be configured to generate and transmit uplink beamformed signals at a mmWave frequency or a sub-6 GHz frequency via the transceiver 1010 and the antenna array 1020. For example, the communication and processing circuitry 1041 may be configured to transmit a respective reference signal (e.g., SRS or DMRS) on each of a plurality of uplink beams to the base station during an uplink beam sweep via at least one second antenna panel of the antenna array 1020.

The communication and processing circuitry 1041 may further be configured to generate and transmit a request to the base station. For example, the request may be included in a MAC-CE carried in a PUSCH, UCI in a PUCCH or PUSCH, a random access message, or an RRC message. The communication and processing circuitry 1041 may further be configured to generate and transmit a scheduling request (e.g., via UCI in a PUCCH) to the base station to receive an uplink grant for a PUSCH.

The communication and processing circuitry 1041 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 1041 may further be configured to control the antenna array 1020 and the transceiver 1010 to search for and identify a plurality of downlink transmit beams during a downlink beam sweep. The communication and processing circuitry 1041 may further be configured to obtain a plurality of beam measurements on each of a plurality of downlink receive beams via the antenna array 1020 for each of the identified downlink transmit beams. The communication and processing circuitry 1041 may further be configured to generate a beam measurement report for transmission to the base station using the transceiver 1010.

The communication and processing circuitry 1041 may further be configured to identify one or more selected uplink beam(s) based on the beam measurements obtained from the downlink beam reference signals. In some examples, the communication and processing circuitry 1041 may be configured to compare the respective reference signal received power (RSRP) or other beam measurement measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1041 may be configured to generate one or more uplink transmit beams for transmission in an uplink beam sweep. Each uplink transmit beam may carry an uplink reference signal (e.g., an SRS) for measurement by the base station. The communication and processing circuitry 1041 may further be configured to identify the selected uplink transmit beam(s) selected by the base station based on the uplink beam measurements. For example, the communication and processing circuitry 1041 may be configured to receive an indication of the selected uplink transmit beam(s) from the base station.

In some implementations where the communication involves receiving information, the communication and processing circuitry 1041 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for decoding.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., a means for transmitting). In some examples, the communication and processing circuitry 1041 may include functionality for a means for encoding.

The processor 1004 may include power control configuration circuitry 1042 configured to perform power control configuration-related operations as discussed herein (e.g., one or more of the operations described in conjunction with FIGS. 6-9). The power control configuration circuitry 1042 may include functionality for a means for receiving (e.g., as described at step 606, 608, 610, 614, and/or 616 of FIG. 6 and/or block 1102 of FIG. 11 and/or block 1402 of FIG. 14 and/or block 1502 of FIG. 15 and/or block 1602 of FIG. 16). The power control configuration circuitry 1042 may include functionality for a means for identifying component carriers (e.g., as described at step 612 of FIG. 6 and/or block 1104 of FIG. 11 and/or block 1404 of FIG. 14 and/or block 1504 of FIG. 15 and/or block 1604 of FIG. 16). The power control configuration circuitry 1042 may further be configured to execute power control configuration software 1052 included on the computer-readable medium 1006 to implement one or more functions described herein.

In some examples, the power control configuration circuitry 1042 may be configured to receive lists of component carriers from a base station (e.g., via RRC signaling, MAC-CE signaling, or other signaling). For example, the power control configuration circuitry 1042 in cooperation with the transceiver 1010 may monitor for signals on downlink resources scheduled by a gNB, and decode the signals to determine whether the gNB transmitted information to the UE 1000 via a particular channel (e.g., a PDSCH). In some examples, the power control configuration circuitry 1042 may be configured to receive configuration information such as pathloss reference signal information from a base station (e.g., via RRC signaling, MAC-CE signaling, or other signaling). In some examples, the power control configuration circuitry 1042 may be configured to receive information that identifies one or more of the component carriers of the lists of component carriers. For example, the power control configuration circuitry 1042 may receive a MAC-CE that identifies a particular component carrier. As another example, the MAC-CE may indicate an update and/or modification of the list of component carriers indicated by RRC signaling. In some examples, the power control configuration circuitry 1042 may be configured to apply the pathloss reference signal information to a set of component carriers. For example, a determination of a particular set of component carriers may be based on a component carrier indicated by a MAC-CE. In some examples, the power control configuration circuitry 1042 may determine which set of a plurality of sets of component carriers includes the component carrier indicated by the MAC-CE.

The processor 1004 may include power control processing circuitry 1043 configured to perform power control processing-related operations as discussed herein (e.g., one or more of the operations described in conjunction with FIGS. 6-9). The power control processing circuitry 1043 may include functionality for a means for applying pathloss reference signal information (e.g., as described at step 618 and/or 620 of FIG. 6 and/or block 1106 of FIG. 11 and/or block 1406 of FIG. 14 and/or block 1506 of FIG. 15 and/or block 1606 of FIG. 16). The power control processing circuitry 1043 may include functionality for a means for transmitting (e.g., as described at step 622 of FIG. 6 and/or block 1108 of FIG. 11 and/or block 1408 of FIG. 14 and/or block 1508 of FIG. 15 and/or block 1608 of FIG. 16). The power control processing circuitry 1043 may further be configured to execute power control processing software 1053 included on the computer-readable medium 1006 to implement one or more functions described herein.

In some examples, the power control processing circuitry 1043 may be configured to calculate a transmit power for a PUSCH transmission during a PUSCH transmission occasion, a PUCCH transmission during a PUCCH transmission occasion, or an SRS transmission during an SRS transmission occasion. In some examples, calculating the transmit power may involve determining a pathloss parameter for a transmit power equation. In some examples, the power control processing circuitry 1043 may be configured to determine the pathloss parameter by measuring reference signals transmitted by a base station and comparing the received power (e.g., RSRP) with the transmit power used by the base station to transmit the reference signals. Here, the reference signals to be measured by the power control processing circuitry 1043 may be indicated by the pathloss reference signal identifier. In addition, the base station may send to the UE an indication of the transmit power used by the base station to transmit the reference signals. In some examples, the power control processing circuitry 1043 may calculate the transmit power for uplink transmissions on a set of component carriers (e.g., the set of component carriers that includes the component carrier indicated by the MAC-CE). The power control processing circuitry 1043 may then cooperate with the transceiver 1010 to configure the transmit power to be used for transmissions on the set of component carriers.

Figure 11:
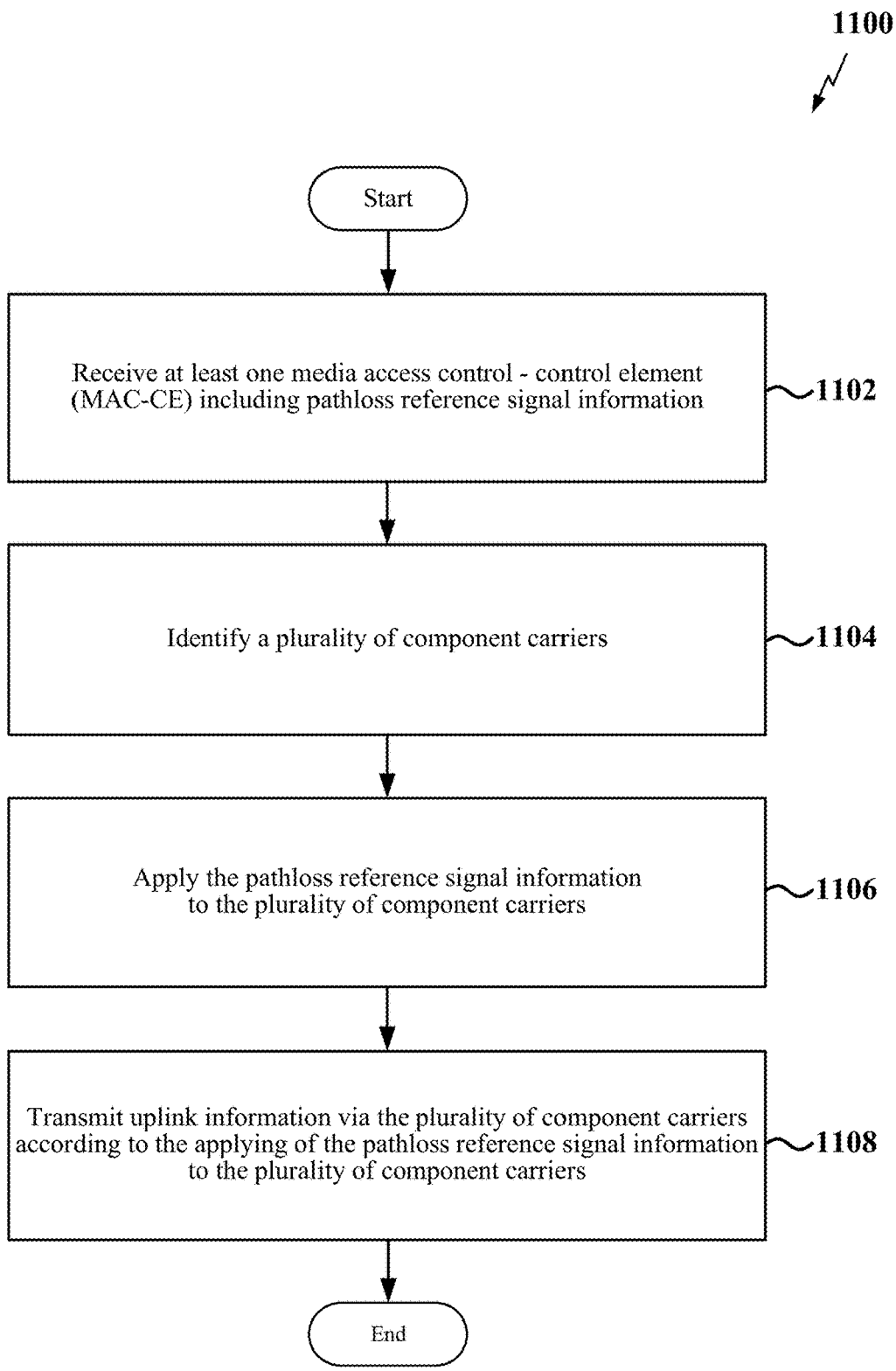
FIG. 11 is a flow chart illustrating an example of a communication process that applies pathloss reference signal information to component carriers according to some aspects.

FIG. 11 is a flow chart illustrating an example process 1100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the UE 1000 illustrated in FIG. 10. In some examples, the process 1100 may be carried out by any suitable apparatus or means for carrying out the functions or algorithm described below.

At block 1102, a UE may receive at least one medium access control-control element (MAC-CE) that includes pathloss reference signal information. For example, the power control configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The power control configuration circuitry 1042 may then parse the MAC-CE to determine whether the MAC-CE is activating and/or updating a pathloss RS ID.

In some examples, the pathloss reference signal information may include a pathloss reference signal identifier for a physical uplink shared channel (PUSCH) transmission. In some examples, the pathloss reference signal identifier corresponds to a sounding reference signal (SRS) resource indicator (SRI) PUSCH power control identifier for the PUSCH transmission.

In some examples, the pathloss reference signal information may include a pathloss reference signal identifier for a physical uplink control channel (PUCCH) transmission.

In some examples, the pathloss reference signal information may include a pathloss reference signal identifier for a sounding reference signal (SRS) transmission. In some examples, the pathloss reference signal identifier is for an SRS resource set for the SRS transmission.

At block 1104, the UE may identify a plurality of component carriers. For example, the power control configuration circuitry 1042 may determine whether the UE has been configured with a list of component carriers. In some examples, the power control configuration circuitry 1042 identifies a list of component carriers that includes the component carrier identified by the MAC-CE received at block 1102.

In some examples, identifying the plurality of component carriers may include receiving a plurality of lists of component carriers, and selecting one list of the plurality of lists of component carriers that includes a first component carrier identified by the MAC-CE. In some examples, the first component carrier identified by the MAC-CE may include a serving cell for which the MAC-CE applies. In some examples, the plurality of lists of component carriers are received via radio resource control signaling or MAC-CE signaling.

At block 1106, the UE may apply the pathloss reference signal information to the plurality of component carriers. For example, the power control processing circuitry 1043 together with the communication and processing circuitry 1041 and the transceiver 1010, shown and described above in connection with FIG. 10, may measure pathloss reference signals corresponding to a pathloss reference signal ID indicated by the MAC-CE of block 1102 and determine the pathloss incurred by the pathloss reference signals (e.g., by subtracting the received power from the transmitted power for these reference signals). The power control processing circuitry 1043 may then calculate the transmit power for an uplink transmission based on the pathloss.

In some examples, applying the pathloss reference signal information to the plurality of component carriers may include configuring power control for the plurality of component carriers according to the pathloss reference signal information. In some examples, applying the pathloss reference signal information to the plurality of component carriers may include applying the pathloss reference signal information to all bandwidth parts of the plurality of component carriers. In some examples, applying the pathloss reference signal information to the plurality of component carriers may include applying the pathloss reference signal information to each control resource set having the same control resource set identifier for all bandwidth parts of the plurality of component carriers.

At block 1108, the UE may transmit uplink information via the plurality of component carriers according to the applying the pathloss reference signal information to the plurality of component carriers. For example, the power control processing circuitry 1043 together with the communication and processing circuitry 1041 and the transceiver 1010 may transmit uplink information via the component carriers identified at block 1104 at a transmit power level determined as discussed above.

In some examples, the uplink information may include a physical uplink shared channel transmission, a physical uplink control channel transmission, or a sounding reference signal transmission.

Figure 12:
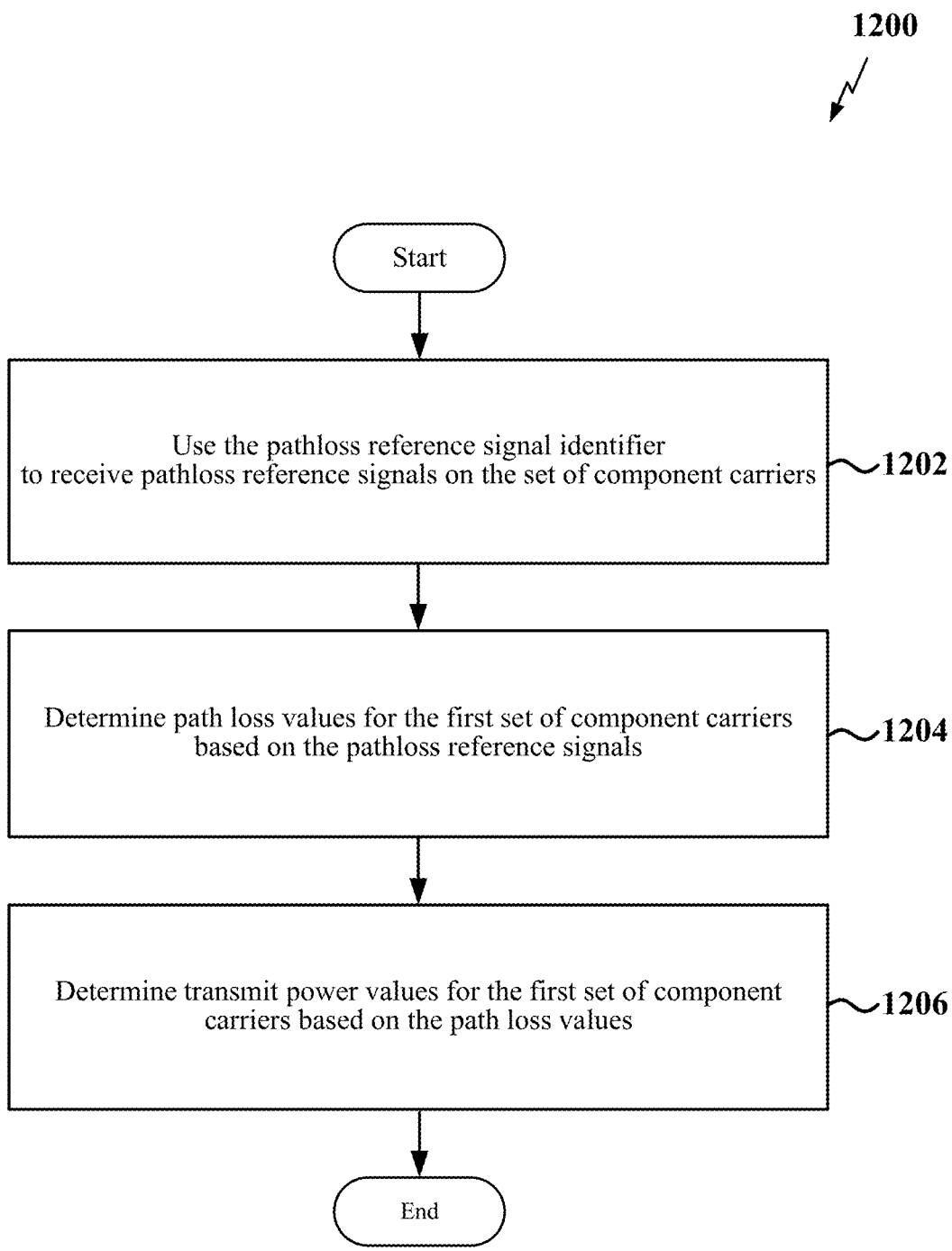
FIG. 12 is a flow chart illustrating an example of a process for determining transmit power according to some aspects.

FIG. 12 is a flow chart illustrating an example process 1200 for a wireless communication system in accordance with some aspects of the present disclosure. In some examples, the process 1200 may be performed in conjunction with (e.g., as part of or in addition to) the process 1100 of FIG. 11. As described below, some or all illustrated features may be omitted in a particular implementation within the scope of the present disclosure, and some illustrated features may not be required for implementation of all embodiments. In some examples, the process 1200 may be carried out by the UE 1000 illustrated in FIG. 10. In some examples, the process 1200 may be carried out by any suitable apparatus or means for carrying out the functions or algorithm described below.

At block 1202, a UE may use the pathloss reference signal identifier to receive pathloss reference signals on the set of component carriers. For example, the power control processing circuitry 1043 together with the communication and processing circuitry 1041 and the transceiver 1010, shown and described above in connection with FIG. 10, may measure pathloss reference signals corresponding to a pathloss reference signal ID indicated by the MAC-CE of block 1102.

At block 1204, the UE may determine pathloss values for the first set of component carriers based on the pathloss reference signals. For example, the power control processing circuitry 1043 may determine the pathloss incurred by the pathloss reference signals (e.g., by subtracting the received power from the transmitted power for this reference signals).

At block 1206, the UE may determine transmit power values for the first set of component carriers based on the pathloss values. For example, the power control processing circuitry 1043 may calculate the transmit power for an uplink transmission based on the pathloss.

Figure 13:
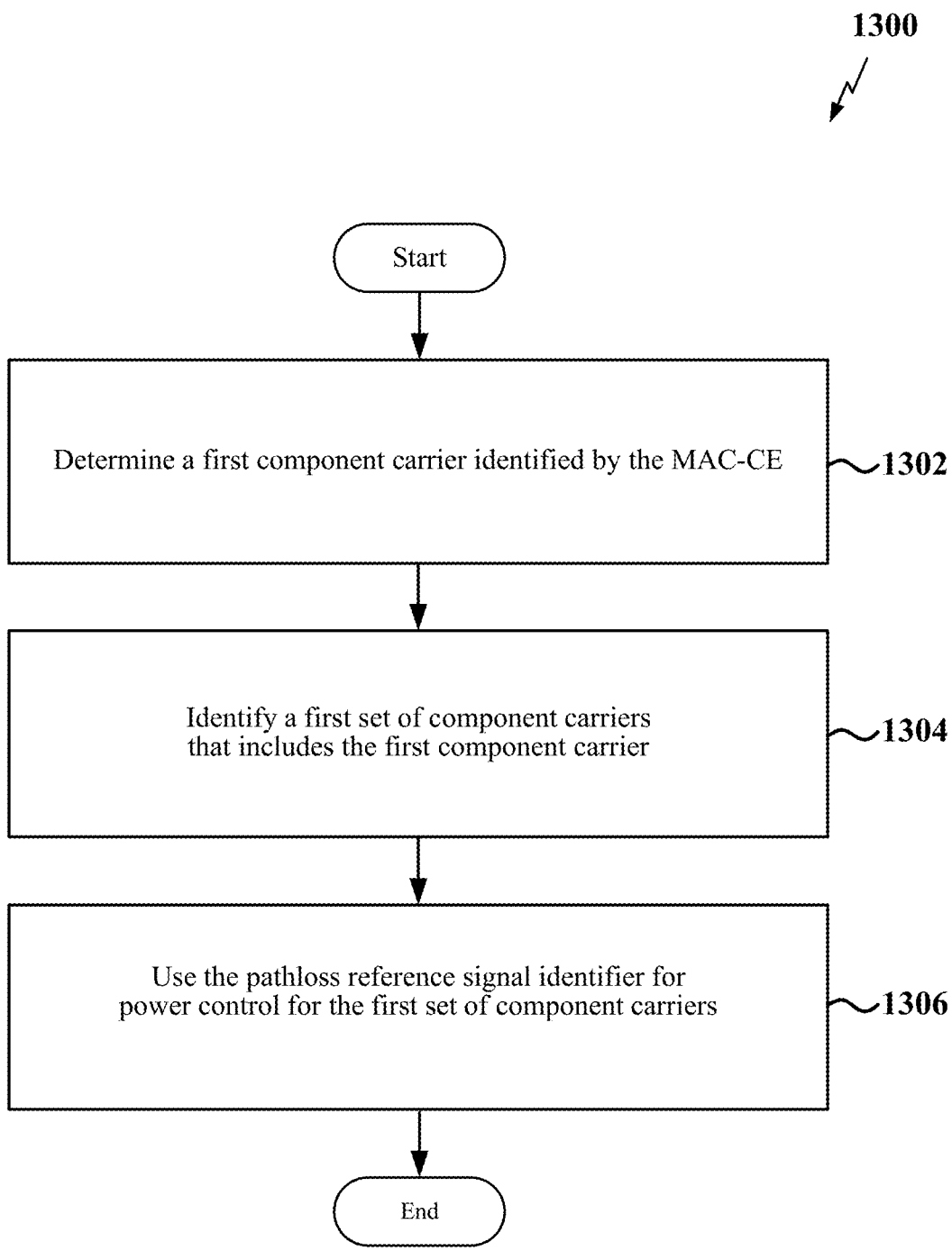
FIG. 13 is a flow chart illustrating an example of a power control process for component carriers according to some aspects.

FIG. 13 is a flow chart illustrating an example process 1300 for a wireless communication system in accordance with some aspects of the present disclosure. In some examples, the process 1300 may be performed in conjunction with (e.g., as part of or in addition to) the process 1100 of FIG. 11. As described below, some or all illustrated features may be omitted in a particular implementation within the scope of the present disclosure, and some illustrated features may not be required for implementation of all embodiments. In some examples, the process 1300 may be carried out by the UE 1000 illustrated in FIG. 10. In some examples, the process 1300 may be carried out by any suitable apparatus or means for carrying out the functions or algorithm described below.

At block 1302, a UE may determine a first component carrier identified by the MAC-CE. For example, the power control configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The power control configuration circuitry 1042 may then parse the MAC-CE to determine whether the MAC-CE includes an identifier of a particular component carrier.

At block 1304, the UE may identify a first set of component carriers that includes the first component carrier. For example, the power control configuration circuitry 1042 may determine whether the UE has been configured with a list of component carriers. In some examples, the power control configuration circuitry 1042 identifies a list of component carriers that includes the component carrier identified by the MAC-CE of block 1302.

At block 1306, the UE may use the pathloss reference signal identifier for power control for the first set of component carriers. For example, the power control processing circuitry 1043 together with the communication and processing circuitry 1041 and the transceiver 1010, shown and described above in connection with FIG. 10, may measure pathloss reference signals corresponding to a pathloss reference signal ID indicated by a MAC-CE and determine the pathloss incurred by the pathloss reference signals (e.g., by subtracting the received power from the transmitted power for this reference signals). The power control processing circuitry 1043 may then calculate the transmit power for an uplink transmission based on the pathloss.

Figure 14:
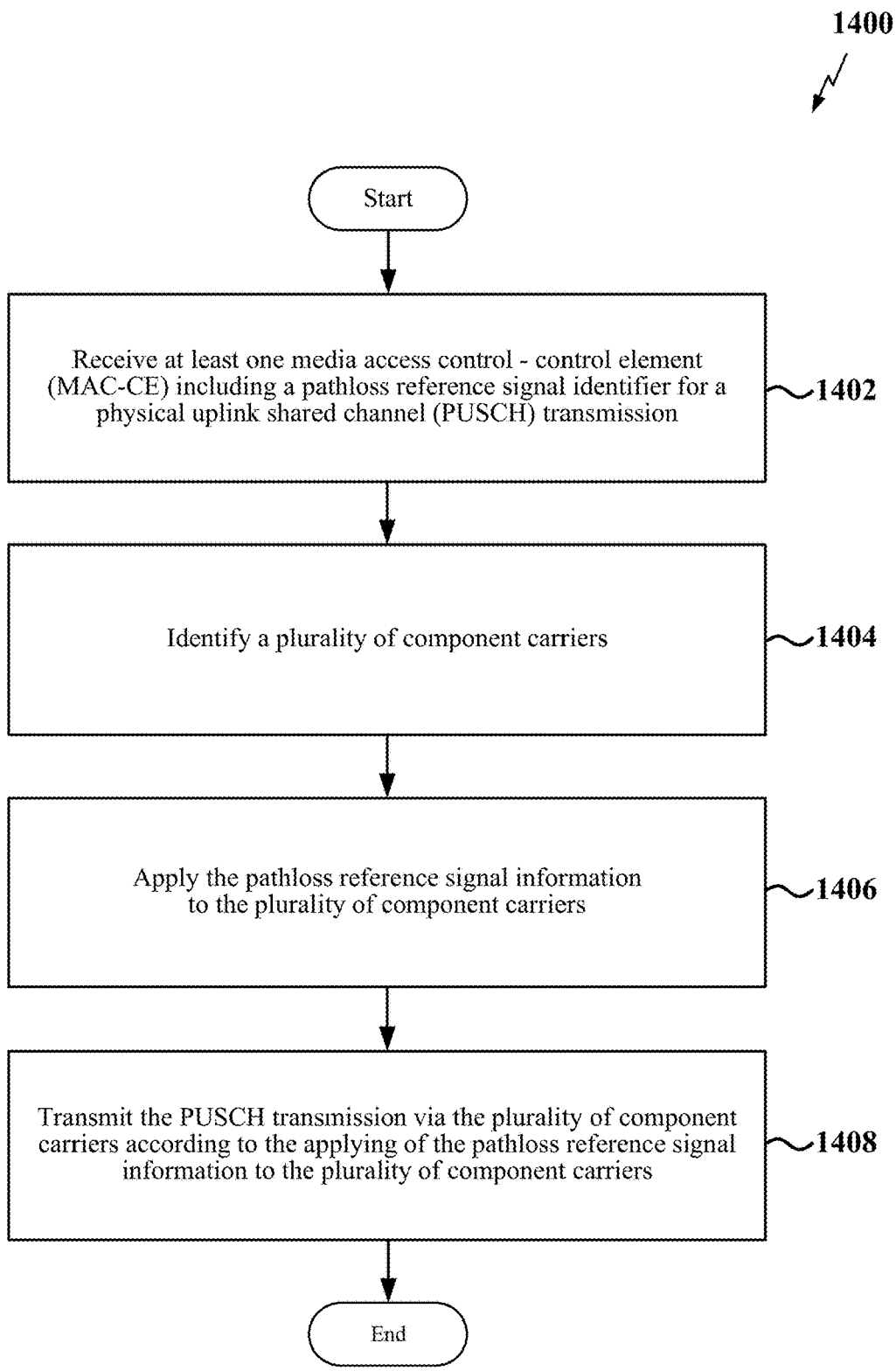
FIG. 14 is a flow chart illustrating an example of a communication process that applies a pathloss reference signal identifier for a PUSCH transmission to component carriers according to some aspects.

FIG. 14 is a flow chart illustrating an example process 1400 for a wireless communication system in accordance with some aspects of the present disclosure. In some aspects, the process 1400 is an example of the process 1100 of FIG. 11. As described below, some or all illustrated features may be omitted in a particular implementation within the scope of the present disclosure, and some illustrated features may not be required for implementation of all embodiments. In some examples, the process 1400 may be carried out by the UE 1000 illustrated in FIG. 10. In some examples, the process 1400 may be carried out by any suitable apparatus or means for carrying out the functions or algorithm described below.

At block 1402, a UE may receive at least one medium access control-control element (MAC-CE) including a pathloss reference signal identifier for a physical uplink shared channel (PUSCH) transmission. For example, the power control configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The power control configuration circuitry 1042 may then parse the MAC-CE to determine whether the MAC-CE is activating and/or updating a pathloss reference signal identifier. In some examples, the pathloss reference signal identifier corresponds to a sounding reference signal (SRS) resource indicator for the PUSCH transmission.

At block 1404, the UE may identify a plurality of component carriers. For example, the power control configuration circuitry 1042 may determine whether the UE has been configured with a list of component carriers. In some examples, the power control configuration circuitry 1042 identifies a list of component carriers that includes the component carrier identified by the MAC-CE received at block 1402.

In some examples, the identification of the plurality of component carriers may include receiving a plurality of lists of component carriers, and selecting one list of the plurality of lists of component carriers based on a component carrier indicated by the MAC-CE. In some examples, the plurality of lists of component carriers are received via radio resource control (RRC) signaling or MAC-CE signaling.

At block 1406, the UE may apply the pathloss reference signal identifier to the plurality of component carriers. For example, the power control processing circuitry 1043 together with the communication and processing circuitry 1041 and the transceiver 1010, shown and described above in connection with FIG. 10, may measure pathloss reference signals corresponding to a pathloss reference signal ID indicated by the MAC-CE of block 1402 and determine the pathloss incurred by the pathloss reference signals (e.g., by subtracting the received power from the transmitted power for this reference signals). The power control processing circuitry 1043 may then calculate the transmit power for an uplink transmission based on the pathloss.

In some examples, the application of the pathloss reference signal identifier to the plurality of component carriers may include configuring power control for the plurality of component carriers according to the pathloss reference signal identifier. In some examples, the pathloss reference signal identifier is for a specified sounding reference signal (SRS) resource indicator (SRI) PUSCH power control identifier.

In some examples, the application of the pathloss reference signal identifier to the plurality of component carriers may include application of the pathloss reference signal identifier to all bandwidth parts (BWPs) of the plurality of component carriers. In some examples, the application of the pathloss reference signal identifier to the plurality of component carriers may include application of the pathloss reference signal identifier to each control resource set having the same control resource set identifier for all bandwidth parts (BWPs) of the plurality of component carriers.

At block 1408, the UE may transmit the PUSCH transmission via the plurality of component carriers according to the application of the pathloss reference signal identifier to the plurality of component carriers. For example, the power control processing circuitry 1043 together with the communication and processing circuitry 1041 and the transceiver 1010 may transmit uplink information via the component carriers identified at block 1404 at a transmit power level determined as discussed above.

Figure 15:
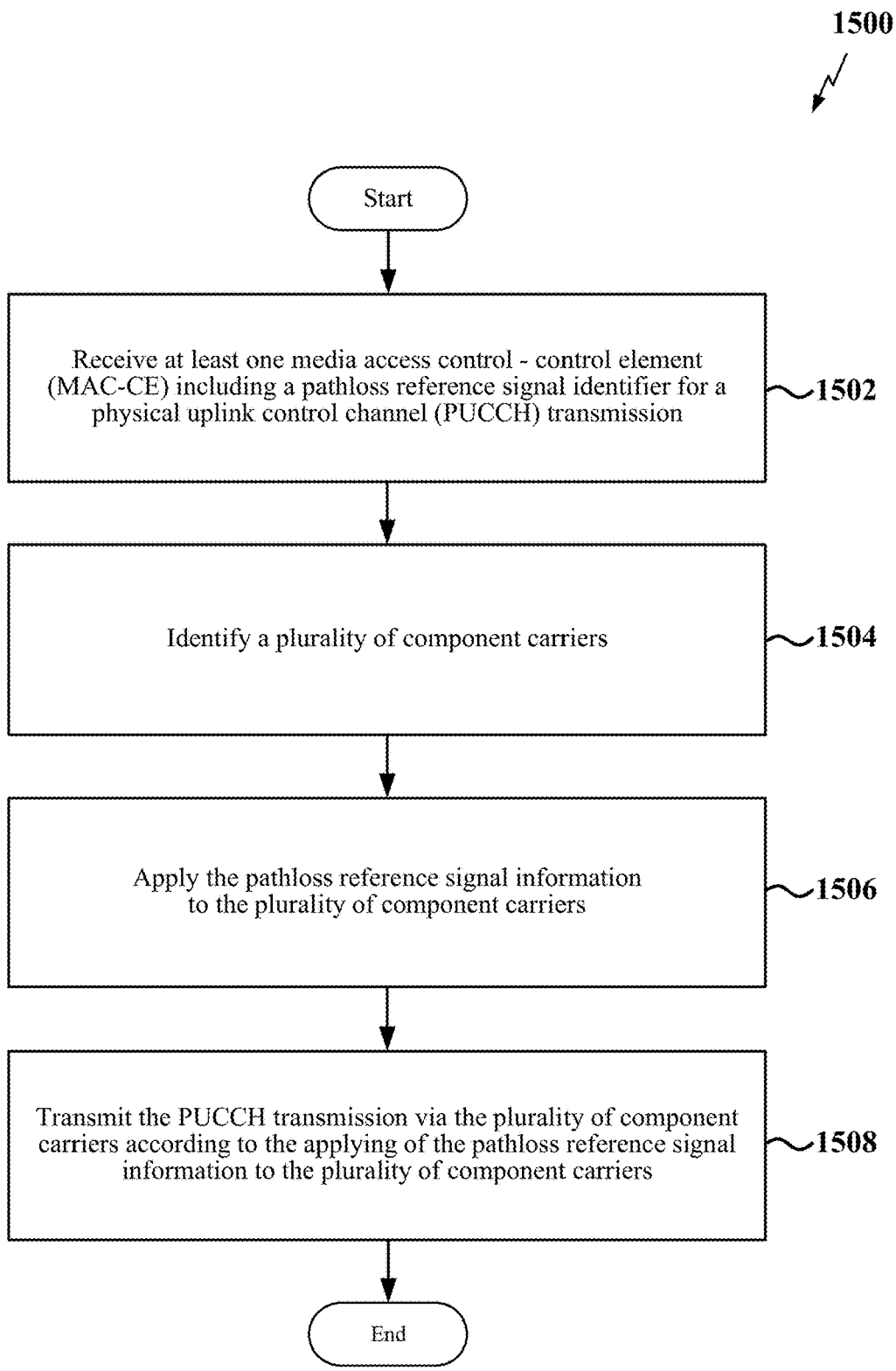
FIG. 15 is a flow chart illustrating another example of a communication process that applies a pathloss reference signal identifier for a PUCCH transmission to component carriers according to some aspects.

FIG. 15 is a flow chart illustrating an example process 1500 for a wireless communication system in accordance with some aspects of the present disclosure. In some aspects, the process 1500 is an example of the process 1100 of FIG. 11. As described below, some or all illustrated features may be omitted in a particular implementation within the scope of the present disclosure, and some illustrated features may not be required for implementation of all embodiments. In some examples, the process 1500 may be carried out by the UE 1000 illustrated in FIG. 10. In some examples, the process 1500 may be carried out by any suitable apparatus or means for carrying out the functions or algorithm described below.

At block 1502, a UE may receive at least one medium access control-control element (MAC-CE) including a pathloss reference signal identifier for a physical uplink control channel (PUCCH) transmission. For example, the power control configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The power control configuration circuitry 1042 may then parse the MAC-CE to determine whether the MAC-CE is activating and/or updating a pathloss reference signal identifier.

At block 1504, the UE may identify a plurality of component carriers. For example, the power control configuration circuitry 1042 may determine whether the UE has been configured with a list of component carriers. In some examples, the power control configuration circuitry 1042 identifies a list of component carriers that includes the component carrier identified by the MAC-CE received at block 1502.

In some examples, the identification of the plurality of component carriers may include receiving a plurality of lists of component carriers, and selecting one list of the plurality of lists of component carriers based on a component carrier indicated by the MAC-CE. In some examples, the plurality of lists of component carriers are received via radio resource control (RRC) signaling or MAC-CE signaling.

At block 1506, the UE may apply the pathloss reference signal identifier to the plurality of component carriers. For example, the power control processing circuitry 1043 together with the communication and processing circuitry 1041 and the transceiver 1010, shown and described above in connection with FIG. 10, may measure pathloss reference signals corresponding to a pathloss reference signal ID indicated by the MAC-CE of block 1502 and determine the pathloss incurred by the pathloss reference signals (e.g., by subtracting the received power from the transmitted power for this reference signals). The power control processing circuitry 1043 may then calculate the transmit power for an uplink transmission based on the pathloss.

In some examples, the application of the pathloss reference signal identifier to the plurality of component carriers may include configuring power control for the plurality of component carriers according to the pathloss reference signal identifier.

In some examples, the application of the pathloss reference signal identifier to the plurality of component carriers may include application of the pathloss reference signal identifier to all bandwidth parts (BWPs) of the plurality of component carriers. In some examples, the application of the pathloss reference signal identifier to the plurality of component carriers may include application of the pathloss reference signal identifier to each control resource set having the same control resource set identifier for all bandwidth parts (BWPs) of the plurality of component carriers.

At block 1508, the UE may transmit the PUCCH transmission via the plurality of component carriers according to the application of the pathloss reference signal identifier to the plurality of component carriers. For example, the power control processing circuitry 1043 together with the communication and processing circuitry 1041 and the transceiver 1010 may transmit uplink information via the component carriers identified at block 1504 at a transmit power level determined as discussed above.

Figure 16:
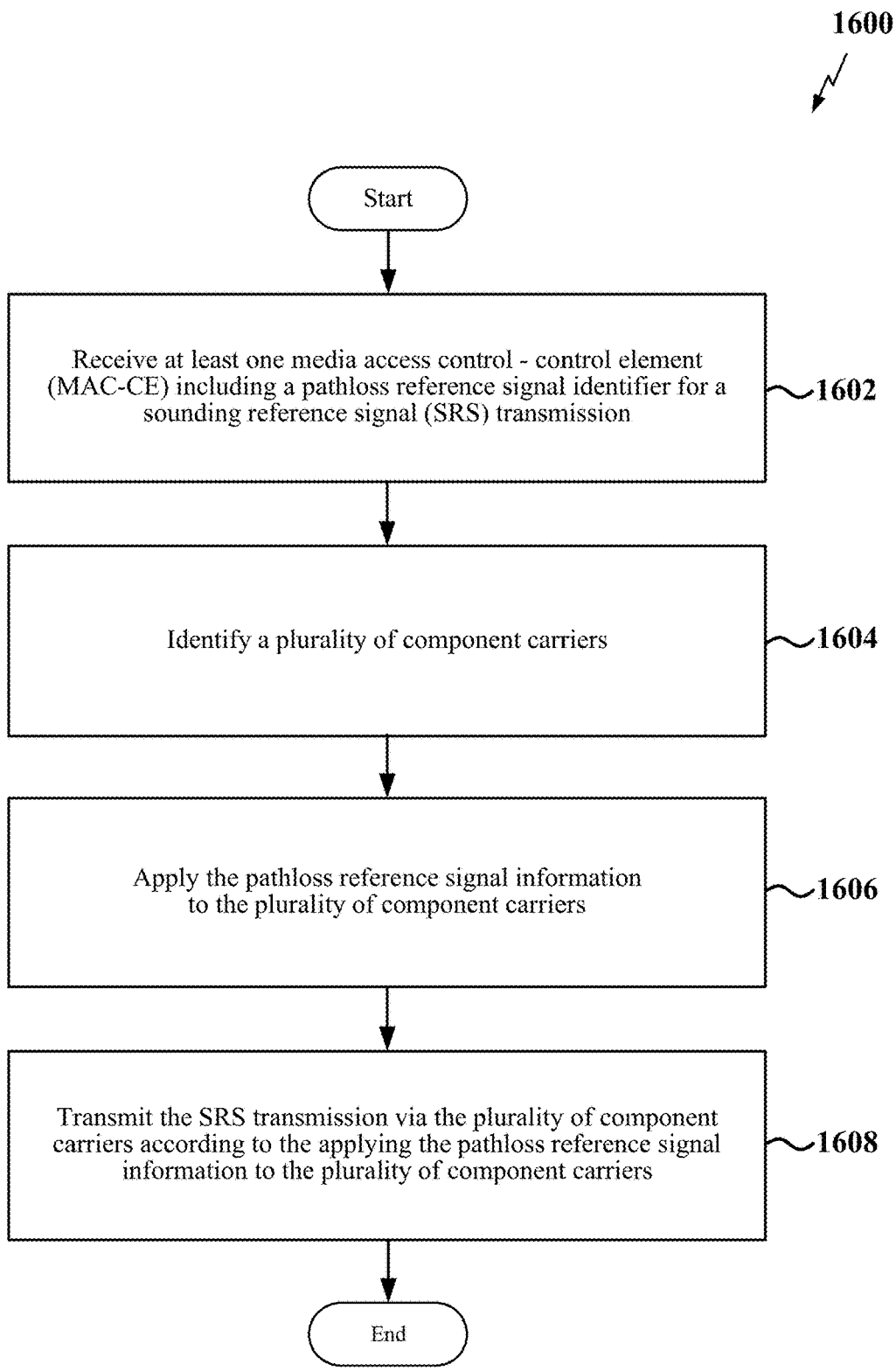
FIG. 16 is a flow chart illustrating another example of a communication process that applies a pathloss reference signal identifier for an SRS transmission to component carriers according to some aspects.

FIG. 16 is a flow chart illustrating an example process 1600 for a wireless communication system in accordance with some aspects of the present disclosure. In some aspects, the process 1600 is an example of the process 1100 of FIG. 11. As described below, some or all illustrated features may be omitted in a particular implementation within the scope of the present disclosure, and some illustrated features may not be required for implementation of all embodiments. In some examples, the process 1600 may be carried out by the UE 1000 illustrated in FIG. 10. In some examples, the process 1600 may be carried out by any suitable apparatus or means for carrying out the functions or algorithm described below.

At block 1602, a UE may receive at least one medium access control-control element (MAC-CE) including a pathloss reference signal identifier for a sounding reference signal (SRS) transmission. For example, the power control configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The power control configuration circuitry 1042 may then parse the MAC-CE to determine whether the MAC-CE is activating and/or updating a pathloss reference signal identifier. In some examples, the pathloss reference signal identifier is for an SRS resource set for the SRS transmission.

At block 1604, the UE may identify a plurality of component carriers. For example, the power control configuration circuitry 1042 may determine whether the UE has been configured with a list of component carriers. In some examples, the power control configuration circuitry 1042 identifies a list of component carriers that includes the component carrier identified by the MAC-CE received at block 1602.

In some examples, the identification of the plurality of component carriers may include receiving a plurality of lists of component carriers, and selecting one list of the plurality of lists of component carriers based on a component carrier indicated by the MAC-CE. In some examples, the plurality of lists of component carriers are received via radio resource control (RRC) signaling or MAC-CE signaling.

At block 1606, the UE may apply the pathloss reference signal identifier to the plurality of component carriers. For example, the power control processing circuitry 1043 together with the communication and processing circuitry 1041 and the transceiver 1010, shown and described above in connection with FIG. 10, may measure pathloss reference signals corresponding to a pathloss reference signal ID indicated by the MAC-CE of block 1602 and determine the pathloss incurred by the pathloss reference signals (e.g., by subtracting the received power from the transmitted power for this reference signals). The power control processing circuitry 1043 may then calculate the transmit power for an uplink transmission based on the pathloss.

In some examples, the application of the pathloss reference signal identifier to the plurality of component carriers may include configuring power control for the plurality of component carriers according to the pathloss reference signal identifier. In some examples, the application of the pathloss reference signal identifier to the plurality of component carriers may include application of the pathloss reference signal identifier to all bandwidth parts (BWPs) of the plurality of component carriers. In some examples, the application of the pathloss reference signal identifier to the plurality of component carriers may include application of the pathloss reference signal identifier to each control resource set having the same control resource set identifier for all bandwidth parts (BWPs) of the plurality of component carriers.

At block 1608, the UE may transmit the SRS transmission via the plurality of component carriers according to the application of the pathloss reference signal identifier to the plurality of component carriers. For example, the power control processing circuitry 1043 together with the communication and processing circuitry 1041 and the transceiver 1010 may transmit uplink information via the component carriers identified at block 1604 at a transmit power level determined as discussed above.

The following provides an overview of examples of the present disclosure.

Example 1: A method for wireless communication at a user equipment, the method comprising: receiving at least one medium access control-control element (MAC-CE) comprising pathloss reference signal information; identifying a plurality of component carriers; applying the pathloss reference signal information to the plurality of component carriers; and transmitting uplink information via the plurality of component carriers according to the applying the pathloss reference signal information to the plurality of component carriers.

Example 2: The method of example 1, wherein the uplink information comprises a physical uplink shared channel transmission, a physical uplink control channel transmission, or a sounding reference signal transmission.

Example 3: The method of example 1 or 2, wherein the identifying the plurality of component carriers comprises: receiving a plurality of lists of component carriers; and selecting one list of the plurality of lists of component carriers that includes a first component carrier identified by the MAC-CE.

Example 4: The method of example 3, wherein the first component carrier identified by the MAC-CE comprises: a serving cell for which the MAC-CE applies.

Example 5: The method of example 3, wherein the plurality of lists of component carriers are received via radio resource control signaling or MAC-CE signaling.

Example 6: The method of any of examples 1 through 5, wherein the pathloss reference signal information comprises: a pathloss reference signal identifier for a physical uplink shared channel (PUSCH) transmission.

Example 7: The method of example 6, wherein the pathloss reference signal identifier corresponds to a sounding reference signal (SRS) resource indicator (SRI) PUSCH power control identifier for the PUSCH transmission.

Example 8: The method of any of examples 1 through 7, wherein the pathloss reference signal information comprises: a pathloss reference signal identifier for a physical uplink control channel (PUCCH) transmission.

Example 9: The method of any of examples 1 through 8, wherein the pathloss reference signal information comprises: a pathloss reference signal identifier for a sounding reference signal (SRS) transmission.

Example 10: The method of example 9, wherein the pathloss reference signal identifier is for an SRS resource set for the SRS transmission Example 11: The method of any of examples 1 through 10, wherein the applying the pathloss reference signal information to the plurality of component carriers comprises: configuring power control for the plurality of component carriers according to the pathloss reference signal information.

Example 12: The method of any of examples 1 through 11, wherein the applying the pathloss reference signal information to the plurality of component carriers comprises: applying the pathloss reference signal information to all bandwidth parts of the plurality of component carriers.

Example 13: The method of any of examples 1 through 12, wherein the applying the pathloss reference signal information to the plurality of component carriers comprises: applying the pathloss reference signal information to each control resource set having the same control resource set identifier for all bandwidth parts of the plurality of component carriers.

Example 14: A user equipment (UE) in a wireless communication network, the UE comprising a transceiver configured to communicate with a radio access network, a memory, and a processor coupled to the transceiver and the memory, the processor and memory configured to perform a method of any one of examples 1 through 13.

Example 15: An apparatus configured for wireless communication comprising at least one means for performing a method of any one of examples 1 through 13.

Example 16: A non-transitory computer-readable medium storing computer-executable code, comprising code for causing an apparatus to perform a method of any one of examples 1 through 13.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-16 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment, the method comprising:
   receiving a plurality of lists of component carriers;
   receiving at least one medium access control - control element (MAC-CE) comprising pathloss reference signal information;
   identifying a plurality of component carriers by selecting one list of the plurality of lists of component carriers that includes a first component carrier identified by the MAC-CE;
   applying the pathloss reference signal information to the plurality of component carriers; and
   transmitting uplink information via the plurality of component carriers according to the applying the pathloss reference signal information to the plurality of component carriers.

2. The method of claim 1, wherein the uplink information comprises a physical uplink shared channel transmission, a physical uplink control channel transmission, or a sounding reference signal transmission.

3. The method of claim 1, wherein the first component carrier identified by the MAC-CE comprises:
   a serving cell for which the MAC-CE applies.

4. The method of claim 1, wherein the plurality of lists of component carriers are received via radio resource control signaling or MAC-CE signaling.

5. The method of claim 1, wherein the pathloss reference signal information of the at least one MAC-CE comprises:
   a pathloss reference signal identifier for a physical uplink shared channel (PUSCH) transmission.

6. The method of claim 5, wherein the pathloss reference signal identifier corresponds to a sounding reference signal (SRS) resource indicator (SRI) PUSCH power control identifier for the PUSCH transmission.

7. The method of claim 1, wherein the pathloss reference signal information comprises:
   a pathloss reference signal identifier for a physical uplink control channel (PUCCH) transmission.

8. The method of claim 1, wherein the pathloss reference signal information of the at least one MAC-CE comprises:

a pathloss reference signal identifier for a sounding reference signal (SRS) transmission.

9. The method of claim 8, wherein the pathloss reference signal identifier is for an SRS resource set for the SRS transmission.

10. The method of claim 1, wherein the applying the pathloss reference signal information to the plurality of component carriers comprises:
configuring power control for the plurality of component carriers according to the pathloss reference signal information.

11. The method of claim 1, wherein the applying the pathloss reference signal information to the plurality of component carriers comprises:
applying the pathloss reference signal information to all bandwidth parts of the plurality of component carriers.

12. The method of claim 1, wherein the applying the pathloss reference signal information to the plurality of component carriers comprises:
applying the pathloss reference signal information to each control resource set having the same control resource set identifier for all bandwidth parts of the plurality of component carriers.

13. A user equipment, comprising:
a transceiver configured to communicate with a radio access network;
a memory; and
a processor coupled to the transceiver and the memory, wherein the processor and the memory are configured to:
receive via the transceiver a plurality of lists of component carriers;
receive via the transceiver at least one medium access control-control element (MAC-CE) comprising pathloss reference signal information;
identify a plurality of component carriers by selecting one list of the plurality of lists of component carriers that includes a first component carrier identified by the MAC-CE;
apply the pathloss reference signal information to the plurality of component carriers; and
transmit uplink information via the plurality of component carriers according to application of the pathloss reference signal information to the plurality of component carriers.

14. The user equipment of claim 13, wherein the uplink information comprises a physical uplink shared channel transmission, a physical uplink control channel transmission, or a sounding reference signal transmission.

15. The user equipment of claim 13, wherein the first component carrier identified by the MAC-CE comprises:
a serving cell for which the MAC-CE applies.

16. The user equipment of claim 13, wherein the plurality of lists of component carriers are received via radio resource control signaling or MAC-CE signaling.

17. The user equipment of claim 13, wherein the pathloss reference signal information of the at least one MAC-CE comprises:
a pathloss reference signal identifier for a physical uplink shared channel (PUSCH) transmission.

18. The user equipment of claim 17, wherein the pathloss reference signal identifier corresponds to a sounding reference signal (SRS) resource indicator (SRI) PUSCH power control identifier for the PUSCH transmission.

19. The user equipment of claim 13, wherein the pathloss reference signal information comprises:
a pathloss reference signal identifier for a physical uplink control channel (PUCCH) transmission.

20. The user equipment of claim 13, wherein the pathloss reference signal information comprises:
a pathloss reference signal identifier for a sounding reference signal (SRS) transmission.

21. The user equipment of claim 20, wherein the pathloss reference signal identifier is for an SRS resource set for the SRS transmission.

22. The user equipment of claim 13, wherein the processor and the memory are further configured to:
configure power control for the plurality of component carriers according to the pathloss reference signal information.

23. The user equipment of claim 13, wherein the processor and the memory are further configured to:
apply the pathloss reference signal information to all bandwidth parts of the plurality of component carriers.

24. The user equipment of claim 13, wherein the processor and the memory are further configured to:
apply the pathloss reference signal information to each control resource set having the same control resource set identifier for all bandwidth parts of the plurality of component carriers.

25. A user equipment, comprising:
means for receiving a plurality of lists of component carriers;
means for receiving at least one medium access control-control element (MAC-CE) comprising pathloss reference signal information;
means for identifying a plurality of component carriers by selecting one list of the plurality of lists of component carriers that includes a first component carrier identified by the MAC-CE;
means for applying the pathloss reference signal information to the plurality of component carriers; and
means for transmitting uplink information via the plurality of component carriers according to the applying the pathloss reference signal information to the plurality of component carriers.

26. The user equipment of claim 25, wherein the uplink information comprises a physical uplink shared channel transmission, a physical uplink control channel transmission, or a sounding reference signal transmission.

27. The user equipment of claim 25, wherein the pathloss reference signal information of the at least one MAC-CE comprises a pathloss reference signal identifier for a physical uplink shared channel transmission, a pathloss reference signal identifier for a physical uplink control channel transmission, or a pathloss reference signal identifier for a sounding reference signal transmission.

28. An article of manufacture for use by a user equipment in a wireless communication network, the article comprising:
a non-transitory computer-readable medium having stored therein instructions executable by one or more processors of the user equipment to:
receive a plurality of lists of component carriers;
receive at least one medium access control-control element (MAC-CE) comprising pathloss reference signal information;
identify a plurality of component carriers by selecting one list of the plurality of lists of component carriers that includes a first component carrier identified by the MAC-CE;
apply the pathloss reference signal information to the plurality of component carriers; and transmit uplink information via the plurality of component carriers according to application of the pathloss reference signal information to the plurality of component carriers.

* * * * *